(12) United States Patent
Lundström et al.

(10) Patent No.: US 7,830,381 B2
(45) Date of Patent: Nov. 9, 2010

(54) SYSTEMS FOR VISUALIZING IMAGES USING EXPLICIT QUALITY PRIORITIZATION OF A FEATURE(S) IN MULTIDIMENSIONAL IMAGE DATA SETS, RELATED METHODS AND COMPUTER PRODUCTS

(75) Inventors: Claes Lundström, Linköping (SE); Patric Ljung, Linköping (SE); Anders Ynnerman, Norrköping (SE)

(73) Assignee: Sectra AB, Linkoping (SE)

( * ) Notice: Subject to any disclaimer, the term of this patent is extended or adjusted under 35 U.S.C. 154(b) by 748 days.

(21) Appl. No.: 11/614,387

(22) Filed: Dec. 21, 2006

(65) Prior Publication Data

US 2008/0150937 A1 Jun. 26, 2008

(51) Int. Cl.
*G06T 15/00* (2006.01)
(52) U.S. Cl. .................. 345/428; 345/424; 382/128; 382/130; 382/132; 382/154; 382/172; 600/410
(58) Field of Classification Search ................. 345/424, 345/428; 382/128, 130, 132, 154, 172; 600/410
See application file for complete search history.

(56) References Cited

U.S. PATENT DOCUMENTS

| | | | | |
|---|---|---|---|---|
| 4,979,136 A | * | 12/1990 | Weiman et al. | 382/169 |
| 5,113,357 A | | 5/1992 | Johnson et al. | 345/424 |
| 5,381,518 A | | 1/1995 | Drebin et al. | 345/424 |
| 5,410,250 A | | 4/1995 | Brown | 324/309 |
| 5,861,891 A | | 1/1999 | Becker | 345/619 |
| 5,917,937 A | | 6/1999 | Szeliski et al. | 382/154 |
| 5,930,803 A | | 7/1999 | Becker et al. | 707/104.1 |
| 5,960,435 A | | 9/1999 | Rathmann et al. | 707/101 |
| 5,986,662 A | | 11/1999 | Argiro et al. | 345/424 |
| 6,008,813 A | | 12/1999 | Lauer et al. | 345/424 |
| 6,026,399 A | | 2/2000 | Kohavi et al. | 707/6 |
| 6,034,697 A | | 3/2000 | Becker | 345/606 |
| 6,078,332 A | | 6/2000 | Ohazama | 345/426 |

(Continued)

FOREIGN PATENT DOCUMENTS

WO WO2005/104037 A2 11/2005

OTHER PUBLICATIONS

Lunstrom et al., Local Histograms for Design of Transfer Functions in Rendering, IEEE Transactions on Visualization and Computer Graphics, Nov. 2006, pp. 1570-1579.*

(Continued)

*Primary Examiner*—Phu Nguyen
(74) *Attorney, Agent, or Firm*—Myers Bigel Sibley & Sajovec, P.A.

(57) ABSTRACT

Visualization systems for rendering images from a multi-dimensional data set, include an interactive visualization system configured to accept user input to define at least one explicit prioritized feature in an image rendered from a multi-dimensional image data set. The at least one prioritized feature is automatically electronically rendered with high or full quality in different interactively requested rendered images of the image data while other non-prioritized features are rendered at lower quality. The visualization system may optionally include a rendering system configured to render images by electronically assigning a level of detail for different tiles associated with an image, each level of detail having a number of pixel samples to be calculated to thereby accelerate image processing.

30 Claims, 16 Drawing Sheets

IMPACT OF PRIORITIZED FEATURES DURING USER INTERACTION

U.S. PATENT DOCUMENTS

| | | | | |
|---|---|---|---|---|
| 6,137,499 | A | 10/2000 | Tesler | 345/440 |
| 6,166,742 | A | 12/2000 | He | 345/421 |
| 6,182,058 | B1 | 1/2001 | Kohavi | 706/45 |
| 6,191,789 | B1 | 2/2001 | Yamato et al. | 345/424 |
| 6,191,791 | B1 | 2/2001 | Dyer et al. | 345/581 |
| 6,219,059 | B1 | 4/2001 | Argiro | 345/424 |
| 6,219,061 | B1 | 4/2001 | Lauer et al. | 345/424 |
| 6,259,451 | B1 | 7/2001 | Tesler | 345/419 |
| 6,261,233 | B1 | 7/2001 | Kantorovich | 600/454 |
| 6,262,740 | B1 | 7/2001 | Lauer et al. | 345/424 |
| 6,278,459 | B1 | 8/2001 | Malzbender et al. | 345/424 |
| 6,278,464 | B1 | 8/2001 | Kohavi et al. | 345/440 |
| 6,301,579 | B1 | 10/2001 | Becker | 707/102 |
| 6,373,483 | B1 | 4/2002 | Becker et al. | 345/419 |
| 6,407,737 | B1 | 6/2002 | Zhao et al. | 345/424 |
| 6,460,049 | B1 | 10/2002 | Becker et al. | 707/104.1 |
| 6,480,194 | B1 | 11/2002 | Sang'udi et al. | 345/440 |
| 6,539,127 | B1 | 3/2003 | Roche et al. | 382/294 |
| 6,556,696 | B1 | 4/2003 | Summers et al. | 382/128 |
| 6,559,843 | B1 | 5/2003 | Hsu | 345/421 |
| 6,585,647 | B1 | 7/2003 | Winder | 600/437 |
| 6,647,283 | B2 | 11/2003 | Klotz | 600/425 |
| 6,664,961 | B2 | 12/2003 | Ray et al. | 345/424 |
| 6,674,430 | B1 | 1/2004 | Kaufman et al. | 345/419 |
| 6,694,163 | B1 | 2/2004 | Vining | 600/407 |
| 6,714,195 | B1 | 3/2004 | Ezra et al. | 345/423 |
| 6,771,262 | B2 | 8/2004 | Krishnan | 345/424 |
| 6,771,263 | B1 | 8/2004 | Behrens et al. | 345/424 |
| 6,798,412 | B2 | 9/2004 | Cowperthwaite | 345/428 |
| 6,801,215 | B1 | 10/2004 | Silva et al. | 345/629 |
| 6,806,705 | B2 | 10/2004 | van Muiswinkel et al. | 324/307 |
| 6,842,176 | B2 | 1/2005 | Sang'udi et al. | 345/440 |
| 6,967,653 | B2 | 11/2005 | Wittenbrink et al. | 345/440 |
| 7,079,140 | B2 | 7/2006 | Boehler et al. | 345/440 |
| 7,123,763 | B2 | 10/2006 | Shinbata | 382/132 |
| 7,379,572 | B2 * | 5/2008 | Yoshida et al. | 382/128 |
| 7,428,323 | B2 * | 9/2008 | Hillman | 382/128 |
| 7,532,214 | B2 * | 5/2009 | Lundstrom | 345/424 |
| 2001/0031920 | A1 | 10/2001 | Kaufman et al. | 600/431 |
| 2002/0183606 | A1 | 12/2002 | Boehler et al. | 600/407 |
| 2003/0009098 | A1 | 1/2003 | Jack et al. | 600/410 |
| 2003/0053668 | A1 | 3/2003 | Ditt et al. | 382/128 |
| 2003/0176780 | A1 | 9/2003 | Arnold et al. | 600/407 |
| 2004/0013292 | A1 | 1/2004 | Raunig | 382/128 |
| 2004/0062429 | A1 | 4/2004 | Kaufhold | 382/132 |
| 2004/0064038 | A1 | 4/2004 | Bruder et al. | 600/425 |
| 2004/0184647 | A1 | 9/2004 | Reeves et al. | 382/131 |
| 2004/0210130 | A1 | 10/2004 | Prince | 600/420 |
| 2004/0259065 | A1 | 12/2004 | Geiger | 434/272 |
| 2005/0017972 | A1 | 1/2005 | Poole et al. | 345/424 |
| 2006/0066628 | A1 | 3/2006 | Brodie et al. | 345/594 |
| 2006/0088198 | A1 | 4/2006 | Arnold | 382/131 |
| 2007/0013696 | A1 | 1/2007 | Desgranges et al. | 345/426 |
| 2007/0019849 | A1 | 1/2007 | Kaufman et al. | 382/128 |
| 2007/0269117 | A1 | 11/2007 | Linkoping et al. | |

OTHER PUBLICATIONS

Adamson et al. *Adaptive Sampling of Intersectable Models Exploiting Image and Object-space Coherence*, Proceedings SIGGRAPH Symposium on Interactive 3D Graphics and Games, 171-178 (2005).

Adobe Systems Incorporated "Adobe® Photoshop® 6.0 User Guide" 16-17 (2000).

Andriole, K.P., *Addressing the Coming Radiology Crisis: The Society for Computer Applications in Radiology Transforming the Radiological Interpretation Process (TRIP™) Initiative*, A position paper from the SCAR TRIP™ subcommittee. http://www.scarnet.org/pdf/2TRIPwhitepaper103.pdf, Nov. 2003.

Bajaj et al., *The Contour Spectrum*, in Proceedings IEEE Visualization, pp. 167-173, (1997).

Biegler Et Al. *A Parametric Analysis Study on the Number of Materials Required for a Convergence of Finite Element Results for a Tibial Bone Model*, Department of Mechanical Engineering, University of Wisconsin-Madison, Madison, WI, presented at 14th Annual Symposium on Computational Methods in Orthopaedic Biomechanics, Chicago, IL (2006).

Cignoni et al. *Multi-resolution Representation and Visualization of Volume Data*, 1077-2626/97, IEEE (1997).

Drebin et al. "Volume Rendering" *Computer Graphics* 22(4):65-74 (1988).

Gao et al. *Visibility Culling Using Plenoptic Opacity Functions for Large Volume Visualization*, IEEE Visualization 341-348 (2003).

Guthe et al. *Advanced Techniques for High Quality Multiresolution Volume Rendering*, Computers and Graphics 48:51-58 (2004).

Hashimoto et al., *Hierarchical Structure efor Data Transmission of Volumetric Medical Images Using three-Dimensional Wavelet Transform*, 0-7803-7324-3/02, IEEE, pp. 1399-1403 (2002).

He et al., *Generation of transfer functions with stochastic search techniques*, in Proceedings IEEE Visualization, pp. 227-234, (1996).

Hladuvka, J. et al., *Curvature-based transfer functions for direct volume rendering*, in Proceedings Spring Conference Computer Graphics 2000, vol. 16, pp. 58-65, (2000).

Kim et al. *An Efficient Data Format for Lossless Compression and It's Application to Interactive Viewing*, 0-7803-3258-X/96, IEEE (1996).

Kindlmann, G. et al., *Curvature-based transfer functions for direct volume rendering: Methods and applications*, IEEE Visualization 2003, pp. 513-520, (2003).

Kindlmann, G. et al., *Semi-automatic generation of transfer functions for direct volume rendering*, in Proceedings IEEE Symposium on Volume Visualization, pp. 79-86, (1998).

Klein et al. *Exploiting Frame-to-Frame Coherence for Accelerating High-Quality Volume Raycasting on Graphics Hardware*, IEEE Visualization, 223-230 (2005).

Kniss, J. et al., *Multidimensional transfer functions for interactive volume rendering*, IEEE Transactions on Visualization and Computer Graphics, vol. 8, No. 3, pp. 270-285, (2002).

Konig, A.H. et al., *Mastering transfer function specification by using VolumePro technology*, in Proceedings Spring Conference Computer Graphics 2001, vol. 17, pp. 279-286, (2001).

Kruger et al. *Acceleration Techniques for GPU-based Volume Rendering*, IEEE Visualization, 287-292 (2003).

Laidlaw, D. et al., *Partial-volume Bayesian classification of material mixtures in MR volume data using voxel histograms*, IEEE Transactions on Medical Imaging, vol. 17, No. 1, pp. 74-86, (1998).

Lamar et al., *Efficient Error Calculation for Multiresolution Texture-based volume Visualization*, Farin G., Hamann B., Hagen H., (Eds.). Springer-Verlag, Heidelberg, Germany, 51-62 (2003).

Levoy, M. et al., *Volume Rendering, Display of surfaces from volume data*, IEEE Computer Graphics and Applications, vol. 8, No. 5, pp. 29-37, (1988).

Levoy, M., *Volume Rendering by Adaptive Refinement*, The Visual Computer 6 (10 pages) (1988).

Li et al., *Time-Critical Multiresolution Volume Rendering using 3D Texture Mapping Hardware*, IEEE Visualization 29-36, (2000).

Ljung, P. et al., *Transfer function based adaptive decompression for volume rendering of large medical data sets*, in Proceedings IEEE Volume Visualization and Graphics Symposium, pp. 25-32, (2004).

Lum, E.B. et al., *Lighting transfer functions using gradient aligned sampling*, IEEE Visualization 2004, pp. 289-296, (2004).

Lundstrom et al., *Extending and Simplifying Transfer Functin Design in Medical Volume Rendering Using Local Histograms*, Eurographics-IEEE VGTC Symposium on Visualization, 8 pages, (Jun. 2005).

Maragos, P. et al., *Morphological systems for multidimensional signal processing*, Proceedings of the IEEE, vol. 78, No. 4, pp. 690-710, (1990).

Marks, J. et al., *Design galleries: A general approach to setting parameters for computer graphics and animation*, in Proceedings SIGGRAPH 1997, pp. 389-400, (1997).

Materialise "Mimics" program description, 1 page (2006) http://www.materialise.com/_mimics/main_ENG.html.

Nyul et al., *On standardizing the MR Image Intensity Scale*, Magnetic Resonance in Medicine 42:1072, pp. 1072-1081, (1999).

Pfister, H. et al., *The transfer function bake-off*, in Proceedings of the IEEE Visualization 2001, pp. 16-22, (2001).

Sato, Y. et al., *Tissue classification based on 3D local intensity structures for volume rendering*, IEEE Transactions on Visualization and Computer Graphics, vol. 6, No. 2, pp. 160-179, (2000).

Tzeng, F.Y. et al., *A novel interface for higher-dimensional classification of volume data*, in Proceedings IEEE Visualization 2003, pp. 505-512, (2003).

Yagel et al., *Accelerating Volume Animation by Space Leaping*, IEEE Visualization, 62-69 (1993).

Zoroffi, R.A. et al., *Automated segmentation of acetabulum and femoral head from 3-D CT images*, IEEE Transactions on Information Technology in Biomedicine, vol. 7, No. 4, pp. 329-343, (Dec. 2003).

*Volume Rendering Overview*, http://www.tgs.com/pro_div/vol_render_overview.htm, 3 Sheets, Copyright TGS 2004.

*Announcement of 7th Symposium, Eurographics/IEEE VGTC Symposium on Visualization*, (scheduled for Jun. 1-3, 2005) http://www.comp.leeds.ac.uk/eurovis/index.html, 2 sheets, believed to be Dec. 2004.

Gudmundsson et al., Incremental generation of projections of CT-volumes, in IEEE Proceedings of First Conference on Visualization in Biomedical Computing, pp. 27-34, 1990.

Ljung, Patric, Adaptive Sampling in Single Pass, GPU-based Raycasting of Multiresolution Volumes, Volume Graphics, (2006).

Westin et al., Using Local 3D Structure for Segmentation of Bone from Computer Tomography Images, in Proceedings Computer Vision and Pattern Recognition, p. 794-800, 1997.

\* cited by examiner

IMPACT OF PRIORITIZED FEATURES DURING USER INTERACTION

FULL QUALITY RENDERING

LIMITED SYSTEM CAPACITY, EQUALLY DOWNGRADED QUALITY FOR ALL TISSUES

LIMITED SYSTEM CAPACITY, PRIORITIZED TISSUE IS GUARANTEED FULL QUALITY.

LIMITED SYSTEM CAPACITY, THE FRAME RATE IS GUARANTEED SO THE PRIORITIZED
TISSUE MAY BE LESS THAN FULL QUALITY, BUT STILL GETS HIGHER QUALITY THAN OTHER TISSUES.

IMPACT OF PRIORITIZED FEATURES DURING DATA TRANSFER IN VISUALIZATION PIPELINE

IMPACT OF PRIORITIZED FEATURES IN LONG-TERM STORAGE

SYSTEMS FOR VISUALIZING IMAGES USING EXPLICIT QUALITY PRIORITIZATION OF A FEATURE(S) IN MULTIDIMENSIONAL IMAGE DATA SETS, RELATED METHODS AND COMPUTER PRODUCTS

FIELD OF THE INVENTION

The present invention relates to renderings of image data and may be particularly suitable for medical imaging data.

BACKGROUND OF THE INVENTION

Two-dimensional (2-D) and three-dimensional (3-D) visualization products for providing medical images can employ rendering techniques to create images from stored electronic data files. The data input used to create the image renderings can be a stack of image slices from a desired imaging modality, for example, a Computed Tomography (CT) or Magnetic Resonance (MR) modality. The visualization can convert the image data into an image volume to create renderings that can be displayed on a workstation display.

Slice-by-slice viewing of medical data may be increasingly difficult for the large data sets now provided by imaging modalities, raising issues of information and data overload and clinical feasibility with current radiology staffing levels. See, e.g., *Addressing the Coming Radiology Crisis: The Society for Computer Applications in Radiology Transforming the Radiological Interpretation Process(TRIP™) Initiative*, Andriole et al., at URL scarnet.net/trip/pdf/TRIP_White_Paper.pdf (November 2003). In some modalities, patient data sets can have large volumes, such as greater than 1 gigabyte, and can even commonly exceed 10's or 100's of gigabytes, hence terabytes of data in a patient multi-dimensional data set is becoming more common.

The diagnostic task of a clinician such as a radiologist can vary patient to patient and, accordingly so can the desired renderings or views of the medical images of the patient. In some visualization systems, a physician uses an interactive workstation that has a data retrieval interface that obtains the medical data for medical image renderings from electronic volume data sets to generate desired medical representations. Image visualizations using the multi-dimensional image data can be carried out using any suitable system such as, for example, PACS (Picture Archiving and Communication System). PACS is a system that receives images from the imaging modalities, stores the data in archives, and distributes the data to radiologists and clinicians for viewing.

Unfortunately, the size of medical volume data sets can inhibit rapid visualization times, particularly with a resolution sufficient for diagnostic purposes. In some cases, interactive image generation of multi-resolution representations may not be feasible using conventional processing techniques even with the use of fast graphic hardware. Two common methods for creating multi-resolution representations are well known to those of skill in the art as a straightforward sub-sampling and a wavelet-based decomposition. See Kim et al., *An Efficient Data Format For Lossless Compression and It's application to Interactive Viewing*, 0-7803-3258-X/96, IEEE (1996) and Hashimoto et al., *Hierarchical Structure for Data Transmission of Volumetric Medical Images Using Three-Dimensional Wavelet Transform*, 0-7803-7324-3/02, IEEE, pp. 1399-1403 (2002). It is also known to employ a lower resolution to reduce data, for example, a "level-of-detail" (LoD) is a very well known term within visualization. For a general description of different data handling techniques including LoD, ad hoc data organizations, approximation techniques, subsampling, and multiresolution representation, see Cignoni et al., *Multi-resolution Representation and Visualization of Volume Data*, 1077-2626/97, IEEE (1997) (proposing the use of tetrahedral meshes to represent and visualize scalar volume data at multiple resolution).

Due to limits in conventional visualization pipeline resources, three-dimensional (3D) viewing or other interactive viewing can present with different quality levels, such as for example, where a fast, but low quality rendering is used during interaction, such as rotation, zoom, and the like. One reason for the lower quality is that full quality rendering typically can take an undue amount of time to compute such that the response time to a user's action/input (rotate, zoom, etc. ... ) can be too long such that the user may not experience a "real-time" control of the visualization. Also, where speed is maintained at the expense of quality level, some users complain that visualization is disturbed when quality level changes during interaction. For example, a user typically desires to be able to interact with images such as to rotate a 3D object back and forth and the visual effect (diagnostic value) of the rotation can be reduced or even lost if the feature in focus has a significantly lower quality during rotations.

SUMMARY OF EMBODIMENTS OF THE INVENTION

Embodiments of the present invention are directed to methods, systems and computer program products that can allow rapid visualization of images during interaction with a user to view a prioritized feature of interest at an increased rendering quality in the different visualizations generated using multidimensional data sets.

Embodiments of the invention are particularly suitable for PACS, however, the invention is, however, more generally applicable, and should not be interpreted to be limited to PACS.

Some embodiments are directed to visualization systems for rendering images from a multi-dimensional data set. The systems include an interactive visualization system configured to accept user input to define at least one explicit prioritized feature in an image rendered from a multi-dimensional image data set. The at least one prioritized feature is automatically electronically rendered with high or full quality in different interactively requested rendered images of the image data while other non-prioritized features are rendered at lower quality.

The system can include a display and the user input includes a graphical user input in communication with the display configured to allow a user to affirmatively designate at least one feature as a prioritized feature for interactive renderings on the display. The rendering can be via DVR and the user input can be configured to allow a user to explicitly designate the at least one prioritized feature using a parameter associated with a Transfer Function.

The systems can include a rendering circuit in communication with the user input, and wherein the user input is configured to allow a user to select whether the at least one prioritized feature is: (a) to be rendered at high or full quality with a potential delay in frame rate; or (b) to be rendered at a frame rate of at least about 5 frames per second with a potential degradation in quality but at a quality that is greater than non-prioritized features in the rendered images whereby the non-prioritized feature quality is dependent on system resources.

The system can be configured to interactively display Direct Volume Renderings of different views of a region of a body of a patent based on the image data set in response to a user's interactive commands to tilt, zoom, rotate, crop or otherwise manipulate the rendered images, with the different views automatically rendering the prioritized feature with high or full resolution while automatically rendering the non-prioritized feature at low resolution to thereby allocate system storage and/or rendering resources to the prioritized feature.

Other embodiments are directed to methods of rendering high or full quality features in a visualization system having limited system capacity. The methods include: (a) accepting user input to define at least one explicit prioritized feature of interest in a rendered image; and (b) interactively rendering and displaying a series of medical images using the at least one explicit prioritized feature, wherein the at least one prioritized feature is automatically electronically rendered with high or full quality in different interactively requested rendered images of the image data while other non-prioritized features are rendered at lower quality.

The method may also include allowing a user to designate whether the system is to render the images with the at least one prioritized feature at a frame rate of at least about 5 frames per second or whether the system is allowed to operate at a slower frame rate to command that the prioritized feature to be rendered at full quality.

Other embodiments are directed to signal processor circuits that include a rendering module for rendering images from respective patient multidimensional imaging data sets obtained from different imaging modalities. The circuit is configured to communicate with a graphical user interface associated with a client workstation to accept user input to define at least one explicit prioritized feature in an image rendered from a multi-dimensional image data set. The at least one prioritized feature is automatically electronically rendered with high or full quality in different interactively requested rendered images of the image data while non-prioritized features are rendered at lower quality.

Other embodiments are directed to computer program products for providing physician interactive access to patient medical volume data for rendering diagnostic medical images. The computer program product includes a computer readable storage medium having computer readable program code embodied in the medium. The computer-readable program code includes: (a) computer readable program code configured to computer readable program code configured to accept user input to define at least one explicit prioritized feature in an image rendered from a multi-dimensional image data set, wherein the at least one prioritized feature is automatically electronically rendered with high or full quality in different interactively requested rendered images of the image data while other non-prioritized features are rendered at lower quality.

Some embodiments are directed to visualization systems for rendering images from a multidimensional data set that include a rendering system configured to render images. The rendering system is configured to electronically assign a level of detail for different tiles associated with an image, the level of detail having a number of pixel samples to be calculated. The rendering system is configured to electronically set a resolution level for different tiles, whereby the resolution level corresponds to the number of pixel samples to be calculated for a respective tile to thereby accelerate image processing.

The multi-dimensional data set can be a volumetric or time-varying volumetric medical data set, and wherein the system further comprises short term electronic storage memory holding patient medical data sets configured to transfer data to the rendering system and a client workstation comprising a display in communication with the rendering system for presenting the rendered images and accepting user input for interactive viewing of selected views of rendered images.

It is noted that any of the features claimed with respect to one type of claim, such as a system, apparatus, or computer program, may be claimed or carried out as any of the other types of claimed operations or features.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 16 shows a benchmark of tile-managed rendering. A simple non-volume rendering shader was used. The performance in terms of frame rate is plotted against tile size. Tiles are rendered using the viewport method.

DETAILED DESCRIPTION OF EMBODIMENTS OF THE INVENTION

Figure 1:
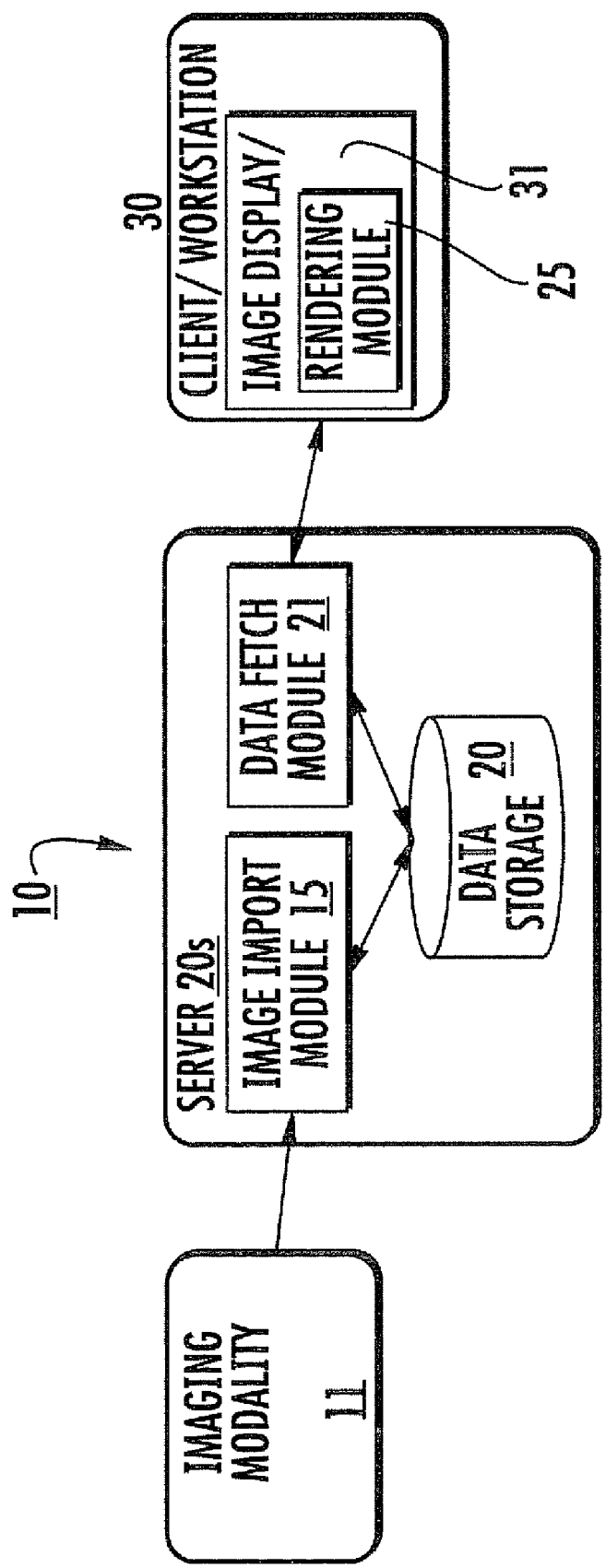
FIG. 1 is a schematic diagram of an electronic visualization system that can be used to render and display (medical) images

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. In the claims, the claimed methods are not limited to the order of any steps recited unless so stated thereat.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

The term "Direct Volume Rendering" or DVR is well known to those of skill in the art. DVR comprises electronically rendering a medical image directly from data sets to thereby display visualizations of target regions of the body, which can include color as well as internal structures, using multi-dimensional 3D or 4D or more dimensional data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs.

Also, although embodiments of the present invention are directed to DVR of medical images, other 3-D image generation techniques and other 3-D image data may also be used. That is, the 3-D images with respective visual characteristics or features may be generated differently when using non-DVR techniques.

The term "automatically" means that the operation can be substantially, and typically entirely, carried out without human or manual input, and is typically programmatically directed or carried out. The term "electronically" includes both wireless and wired connections between components. The term "image quality" in a medical image context refers to diagnostically relevant content in the rendered image. Full or high quality means that important anatomical and/or functional features are shown at as high precision as the resolution of the original data set permits. Low quality means that features are shown with less precision or focus.

The term "clinician" means physician, radiologist, physicist, or other medical personnel desiring to review medical data of a patient. The term "tissue" means blood, cells, bone and the like. "Distinct or different tissue" or "distinct or different material" means tissue or material with dissimilar density or other structural or physically characteristic. For example, in medical images, different or distinct tissue or material can refer to tissue having biophysical characteristics different from other (local) tissue. Thus, a blood vessel and spongy bone may have overlapping intensity but are distinct tissue. In another example, a contrast agent can make tissue have a different density or appearance from blood or other tissue.

Visualization means to present medical images to a user/clinician for viewing. The visualization can be in a flat 2-D and/or in 2-D what appears to be 3-D images on a display, data representing features with different visual characteristics such as with differing intensity, opacity, color, texture and the like. The images as presented by the visualization do not have to be the same as the original construct (i.e., they do not have to be the same 2-D slices from the imaging modality). Two common visualization techniques (apart from viewing original slices) are Multiplanar Reconstruction (MPR), which shows an arbitrary oblique slice through the anatomy and Maximum Intensity Projection (MIP) where a slab is visualized by displaying the maximum value "seen" from each image pixel. For MPR, there are a number of variants, the slice can be thin or constructed by averaging a thicker slab, etc. . . . .

The term "similar examination type" refers to corresponding anatomical regions or features in images having diagnostic or clinical interest in different data sets corresponding to different patients (or the same patient at a different time). For example, but not limited to, a coronary artery, organs, such as the liver, heart, kidneys, lungs, brain, and the like.

The term "explicit prioritization" and derivatives thereof, refer to direct input and/or definition by a user as to what particular feature(s), typically an individual feature and/or attribute, that is of primary interest or focus in an image data set such that that features is electronically assigned a viewing parameter priority for visualization and is to be rendered at higher quality than non-prioritized features in all renderings, despite system rendering capacity. The explicit prioritization is in contrast to indirect definition of regions of interest in volumetric data sets identification of features. The term "prioritized feature" refers to a feature that will be electronically rendered with increased resolution relative to non-prioritized features in serial and/or concurrent interactive visualizations. Once the prioritized feature is explicitly defined or designated for a particular data set, an electronic viewing parameter template can be used to establish this same prioritized feature in similar examination types of different image data sets. In the medical image case, the prioritized feature usually corresponds to a particular tissue, such as bone, blood vessels, blood, brain tissue (white or gray matter), skin, cartilage, tendon, ligament, etc.

A data set can be defined as a number of grid points in G dimensions, where there is V number of values in each grid point. The term "multi-dimensional" refers to both components, grid G and variates V, of the data sets. For data sets having a $V \geq 1$, the data set is referred to as multi-variate. Examples: a normal medical data set has $G=3$ and $V=1$, a normal time-dependent volume has $G=4$ and $V=1$, a volume describing flow will have $G=3$ and $V=3$ (three values, since the velocity is a 3D vector). The data sets of the instant invention for medical images will typically have G and V values of: $G \leq 4$ and $V \leq 6$.

In the description that follows, a client-server setup is illustrated, but the data retrieval interfaces contemplated by the instant invention may be implemented within one computer as well. The term "client" will be used both to denote a computer and the software (application) running on the computer. Additional computers can be used including more than one server and/or more than one client for a workstation. For example, the server can be more than one server with different functions carried out by or between different servers, such as the patient data short or long-term storage can be on one or more separate servers.

Generally stated, in a visualization pipeline system, resources are often limited, meaning that full quality renderings are not technically achievable within acceptable viewing timelines of respective users. Embodiments of the invention explicitly define (manually or automatically) a prioritized feature in the visualization such that high rendering quality can be retained for the prioritized feature while other features can be simplified (shown in lower quality or omitted) in order to comply with system resources. For example, one example from medical imaging is an angiography image volume where vessels are to be studied and the other anatomy is used merely for context information. Making the vessels the prioritized feature and allowing the rendering quality of other body parts to be decreased, can greatly reduce the strain on the visualization system, allowing for acceptable interactive frame rates, low data loading delays and low storage space requirements.

Turning now to FIG. 1, an exemplary visualization system 10 is illustrated. As known to those of skill in the art, the system 10 can include at least one server 20s with an image import module 15, patient data storage 20, a data fetch module 21, a client (and/or workstation) 30 and a rendering system 25. The visualization system 10 can be in communication with at least one imaging modality 11 that electronically obtains respective volume data sets of patients and can electronically transfer the data sets to the electronic storage 20. The imaging modality 11 can be any desirable modality such as, but not limited to, NMR, MRI, X-ray of any type, including, for example, CT (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e., a common system may render images for both CT and MRI volume image data). In some embodiments, the system 10 may optionally combine image data sets generated from different imaging modalities 11 to generate a combination image for a patient.

The rendering system 25 can be in communication with a physician workstation 30 to allow user input (typically graphical user input ("GUI")) and interactive collaboration of image rendering to give the physician alternate image views of the desired features in generally, typically substantially, real time. The rendering system 25 can be configured to zoom, rotate, and otherwise translate to give the physician visualization of the patient data in one or more views, such as section, front, back, top, bottom, and perspective views. The rendering system 25 may be wholly or partially incorporated into the physician workstation 30, or can be a remote or local module (or a combination remote and local module) component or circuit that can communicate with a plurality of physician workstations (not shown). The visualization system can employ a computer network and may be particularly suitable for clinical data exchange/transmission over an intranet. A respective workstation 30 can include at least one display 31 (and may employ two or more adjacent displays). The workstation 30 and/or rendering system 25 form part of an image processor system that includes a digital signal processor and other circuit components that allow for collaborative interactive user input using the display at the workstation 30. Thus, in operation, the image processor system renders the visualization of the medical image using the medical image volume data, typically on at least one display at the physician workstation 30.

Figure 2:
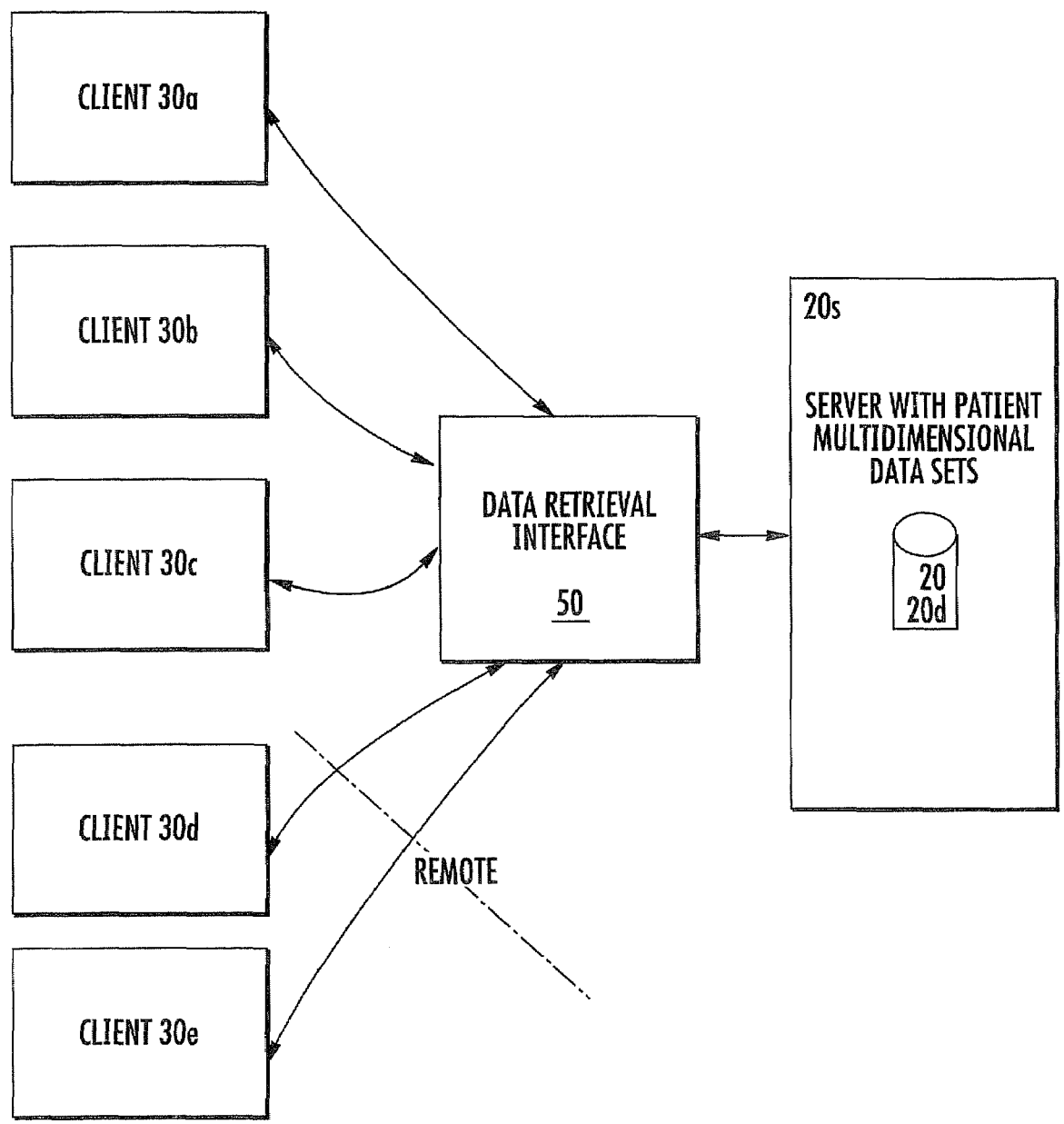
FIG. 2 is a schematic illustration of an imaging visualization system such as a PACS according to embodiments of the present invention.

As shown in FIG. 2, each respective workstation 30 can be described as a client 30 (shown as 30a, 30b, 30c, . . . 30e) that communicates with at least one (hub or remote) server 20s that stores the patient data sets or is in communication with the stored patient electronic data files 20. Additional numbers of clients 30 may be in communication with the server 20s and more than one server 20s may be used to store patient data. A data retrieval interface 50 can be used to communicate with the clients 30a-30e and the stored data sets on and/or accessible via server 20s. Some of the clients, shown as clients 30a, 30b, 30c can be local (within a common clinic or facility) and can access the data sets via a relatively broadband high speed connection using, for example, a LAN, while others, shown as clients 30d, 30e, designated by the broken line, may be remote and/or may have lesser bandwidth and/or speed, and for example, may access the data sets via a WAN and/or the Internet. Firewalls may be provided as appropriate for security.

For ease of discussion, the data retrieval interface 50 is shown as a stand-alone module or circuit. However, the interface 50 can be disposed partially on each client 30, partially or wholly on the server 20s, or may be configured as a discrete data retrieval interface server 50s (not shown). The clients 30, server 20s and/or interface 50 can each include a digital signal processor, circuit and/or module that can carry out aspects of the present invention. As shown in FIG. 2, all or selected ones of the clients 30a-30e can be online at the same time and may each repeatedly communicate with the data retrieval interface 50 to request volume image data, potentially resulting in a speed penalty and inhibiting fast system performance.

Figure 3:
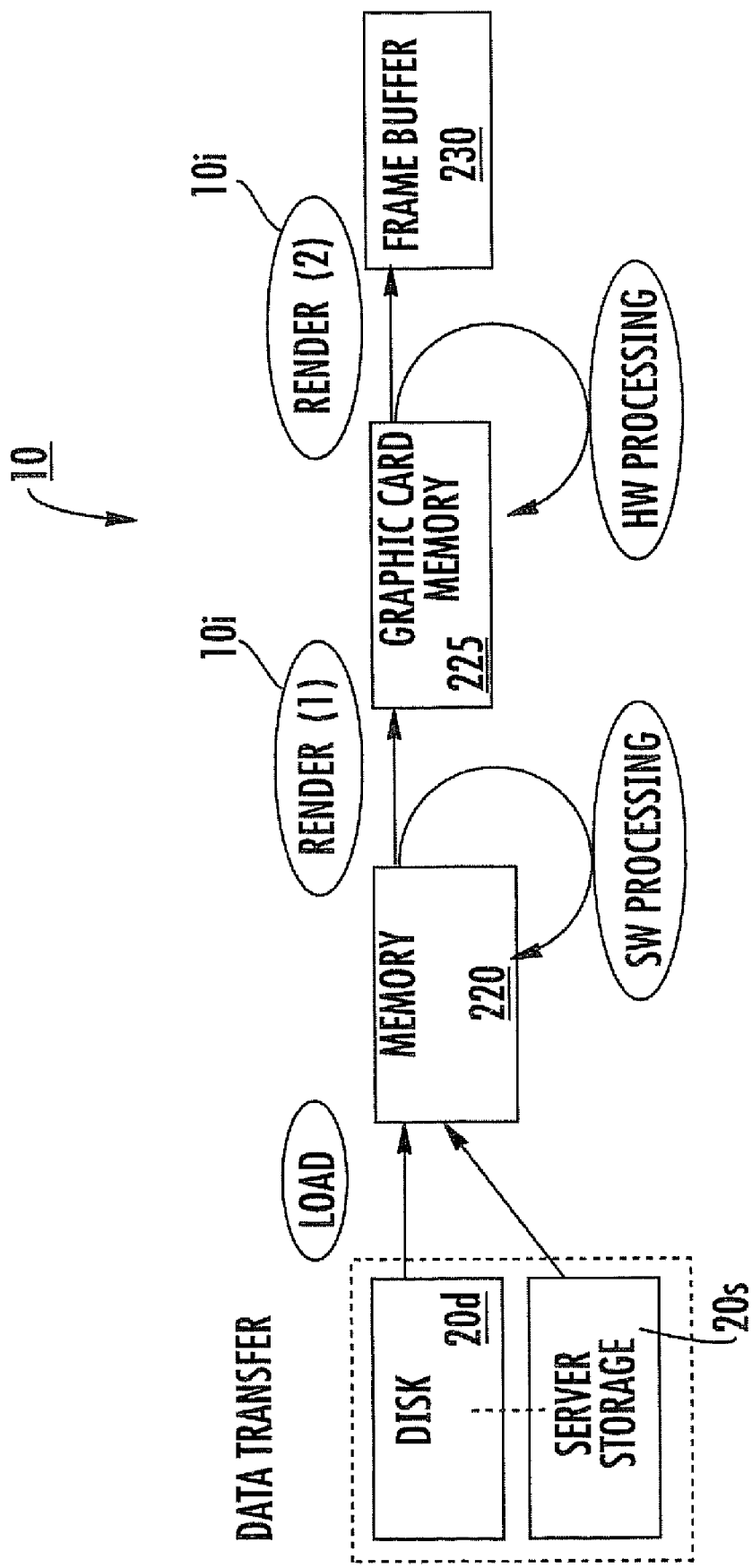
FIG. 3 is a schematic illustration of a visualization pipeline with data transfer and rendering components according to embodiments of the present invention.

FIG. 3 illustrates some components of a visualization pipeline 10. As shown, the components can include at least one storage server 205, at least one data storage disk 210, electronic memory 220, graphic card memory 225, and a frame buffer 230. Standard data sets to be visualized, for instance in medical imaging, often consist of extremely large amounts of data. The large data content can exceed the capacities of the hardware and software components involved in a visualization pipeline 10. FIG. 3 illustrates that when a user is interacting with a visualization, the system 10 is directed to load data to memory 220 and serially render visualizations 10i of different image views of a patient image data set (shown schematically by the phrases render (1) and (2)). In so doing, certain hardware and/or software processing limitations may exist. FIG. 2 shows an example of some technical limitations that may exist, e.g., in terms of disk capacity, network bandwidth, disk I/O bandwidth, memory access times, CPU speed, GPU speed, graphic card memory capacity, and graphics bus bandwidth. Some systems can employ methods to reduce the amounts of data to be transferred through the pipeline, but the present invention facilitates that the resulting visualization is performed so that it does not hinder the visualization-user in performing the task at hand, for instance, a physician making a diagnosis.

Figure 4A:
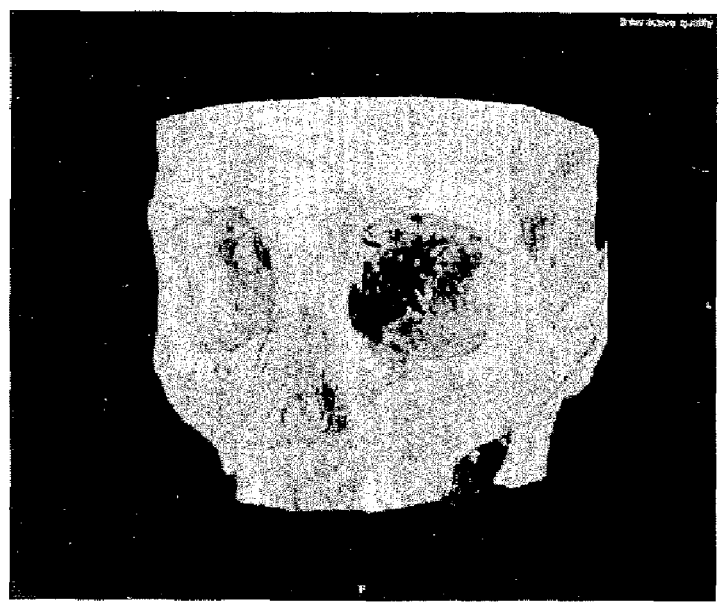
FIG. 4A is a screen shot of an image with an exemplary rendering with reduced quality during interactive visualization of images.
Figure 4B:
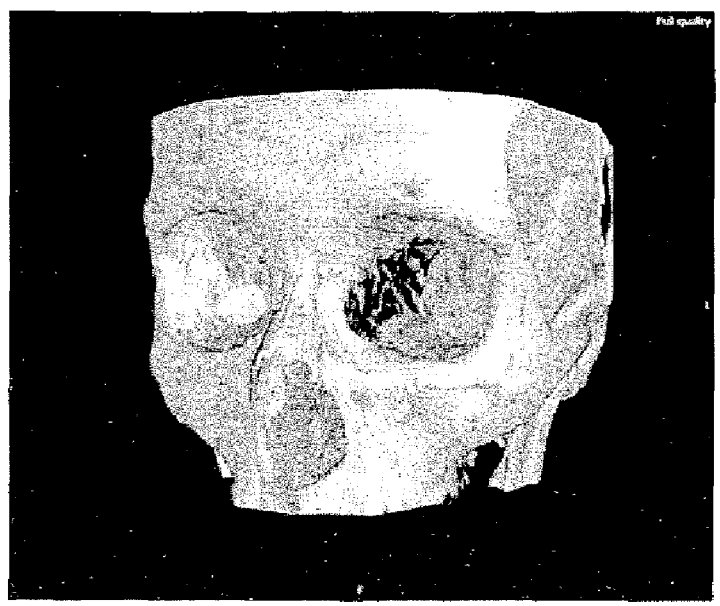
FIG. 4B is a screen shot of the image at full rendering quality.

FIG. 4A illustrates a visualization rendered with lower quality due to system limitations while, for comparison, FIG. 4B illustrates a visualization rendered at full quality.

One consequence of the large data sets is the relatively extreme requirements on storage space. A common system setup for medical images is to use a short-term storage disk, server or other electronic memory for a period of a few months after a respective examination, then electronically send the images to long-term storage. The storage capacity problem is greatest for the long-term storage, since there is always a limited amount of cases in the short-term storage. To decrease storage space, the stored data can be compressed to various degrees. One drawback of saving storage space using compressed data can be that image quality is reduced. Whenever the images are viewed in reduced form, information may be lost that is potentially important for further treatment. Also, in this case, the system may need to use data reduction methods that can still maintain the effective quality of the image, i.e., that can preserve the features important for the usage of the data.

Figure 5:
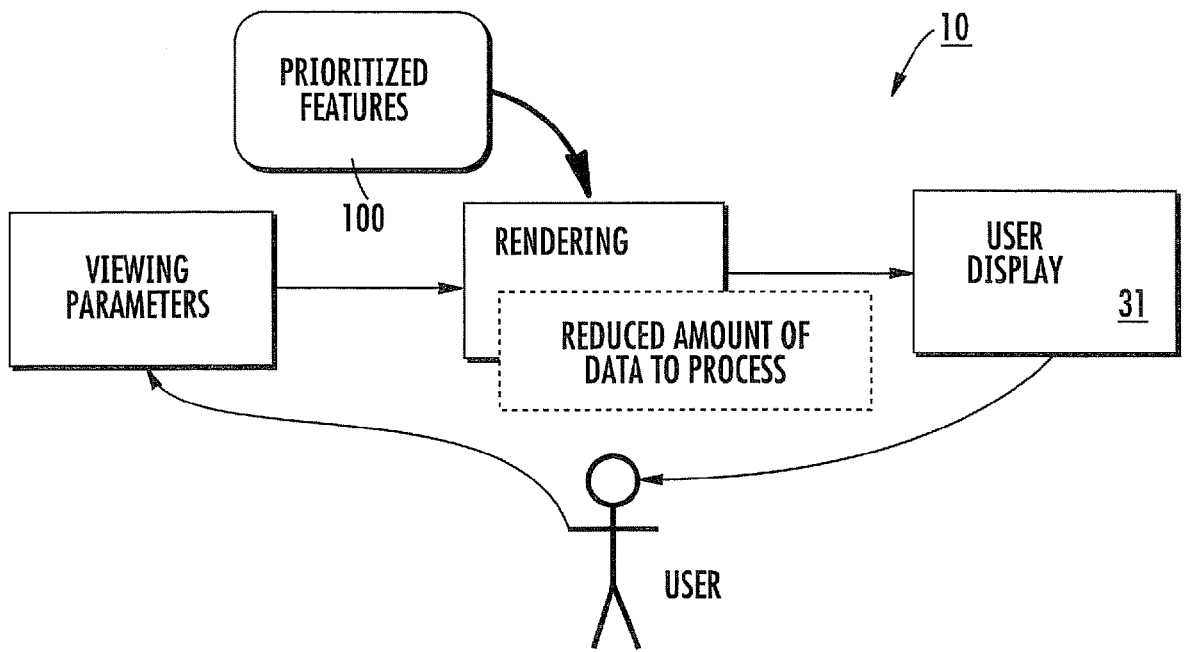
FIG. 5 is a schematic diagram of a visualization system using explicit prioritized feature(s) at rendering to render images with reduced data according to embodiments of the invention.

As shown in FIG. 5, embodiments of the invention allow a user to explicitly define or identify one or more prioritized features of interest in the data for rendering the image. In some embodiments, two different prioritized feature modes are possible with the prioritized feature or attribute being one of the viewing parameters. Each mode can be selected by a user, prior to and/or during visualization, typically depending on a specific user's preference. One mode can allow a user to select a prioritized feature for visualization whereby substantially full quality of the prioritized feature(s) is maintained while accepting a lower rendering update rate (frame rate) and a lower resolution image quality of other features. Another explicit prioritized feature mode can allow a user to maximize or retain a desired frame rate (or frame rate range), while retaining sufficient, if not full quality image resolution of the prioritized feature. Thus, prioritization between frame rate and context feature quality may also be steered, e.g., to maximize frame rate (while still retaining full quality of the prioritized feature). The primary goal of the second mode is to operate at the desired frame rate but the prioritized feature is assigned a disproportionately large amount of system resources and is thus rendered at higher quality than other features. Full image quality is not guaranteed, however, as the frame rate requirement has precedent in this mode. A typically acceptable frame rate is at least about 5 frames per second (fps). A fast frame rate is typically above about 10 fps. When using the explicit prioritization for rendering, bandwidth requirements may be (on average) reduced to about 20% and typically about 10% of the original data with useful quality, or even 1% in an extreme case where the prioritized tissue occupy little space such as vessels. Where the explicit prioritization is used for storing image data, the system may realize a feasible reduction for storage a reduction of between about 20% down to 5% over conventional systems, since the visualization system 10 typically allows some flexibility when using it.

Figure 6:
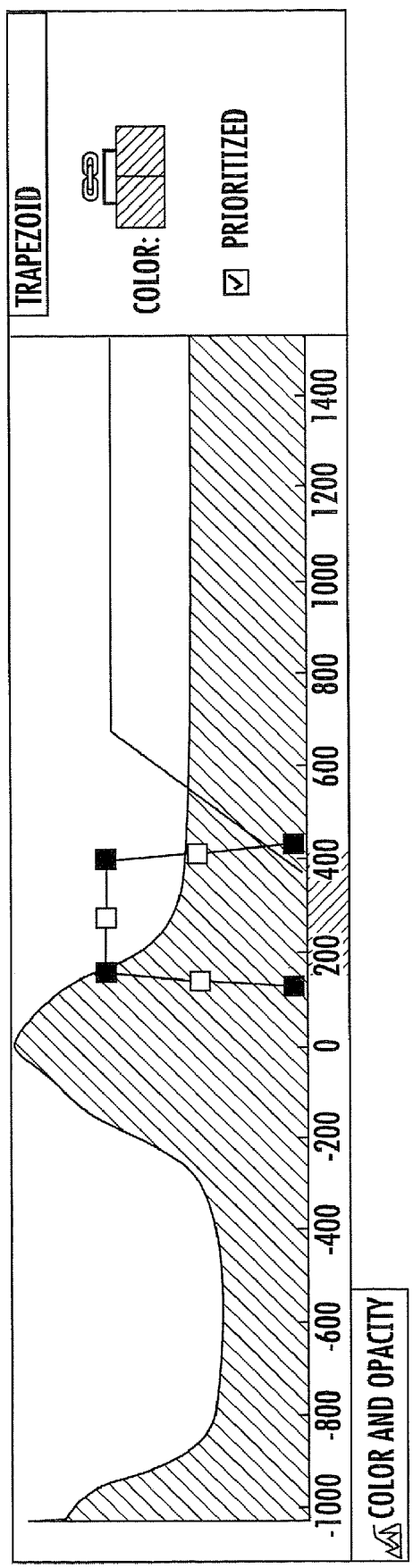
FIG. 6 is a diagram of an exemplary explicit prioritization user interface for a visualization system according to embodiments of the invention.

FIG. 6 illustrates that the user input can be via a GUI 31g in communication with the display 31. As such, the user input 31g can allow a clinician to select a feature and label this feature as "prioritized" for subsequent renderings. A different label for "prioritized" may be used, including a graphic indication (e.g., desktop icon) of importance or focus or other textual labels or combinations of text and graphics. The user input 31g can be via a touch screen (such as selecting a tick box) to activate prioritization of a feature. The user input to activate a prioritization setting may be via a mouse or keyboard or even voice recognition command input and is not limited to touch screen input. The option for prioritization can be via other interfaces such as, a pull down menu and the like. The prioritized feature(s) corresponds to what the user targets to be of primary interest/focus when studying a visualization of the data, a.k.a., the rendered image, whereas the other visible data can be merely used to give context to the primary or focal feature(s). A user may also affirmatively command the system to save the prioritized feature data set for future renderings.

In some embodiments, the data can be segmented into three components, the prioritized data, the non-prioritized data, and a third part of the data can be for those features that become completely invisible in the visualization. Thus, the defined or identified prioritized feature(s) can be electronically assigned a disproportionately large amount of resources for the rendering of the prioritized feature(s) to facilitate that the prioritized feature(s) has high and/or full quality even though system resources are limited, at the expense of less important data. The prioritized feature is a distinct feature rather than a region of interest.

In some embodiments, the prioritization can be implemented both or either as a user-specific selection option or as a pre-defined template setting that can be automatically or manually applied to other data sets. The other data sets can be of similar type, e.g., angiography, or cover the same body part.

FIG. 6 illustrates that the display 31 can show a Transfer Function ("TF") of color and opacity with two tissues defined by trapezoids, corresponding in the example to blood vessels (red) and bone (white). The dark grey area across the display segment in FIG. 6 illustrates the histogram of intensity values. When a trapezoid (or other suitable shape) is selected, the user can set its color and/or its prioritization as shown by the input region in the right side of FIG. 6. Thus, a user visualizes the data set by defining features of interest and can assign associated visual appearance properties.

The prioritized features (e.g., tissues) are typically defined by a value range (intensity range) in the data set. The appearance is typically at least a color and an opacity. The definition and appearance are commonly joined in a TF definition. A common TF construction mode is to have tissue-specific trapezoids. The x-axis extent of the trapezoid defines the value range of the tissue. The y-axis, i.e., the height of the trapezoidal function, defines the opacity for this intensity value. The color for each tissue can be set in a separate color selection control. A user interface can be modified or added to let the user define whether a feature (tissue) is prioritized or not (such as a tick box or similar input interface). Also, there are many ways of defining a TF and embodiments of the invention are not limited to any particular technique. In addition, the user interface to select the prioritization setting can be provided in a number of different manners.

Figure 7A:
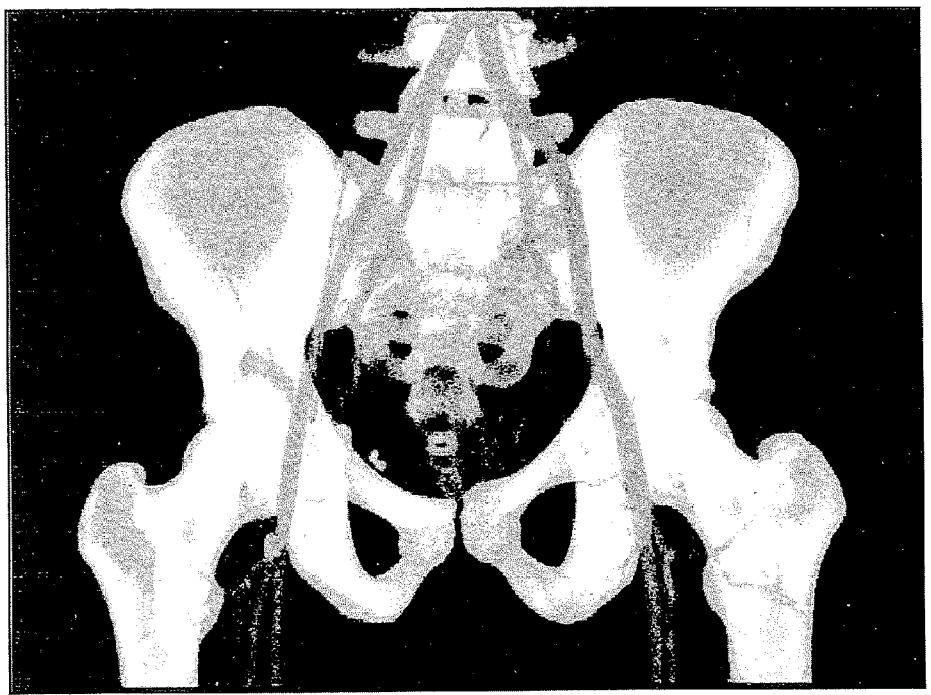
FIG. 7A is a screen shot of an image of pelvis rendered in full quality.
Figure 7B:
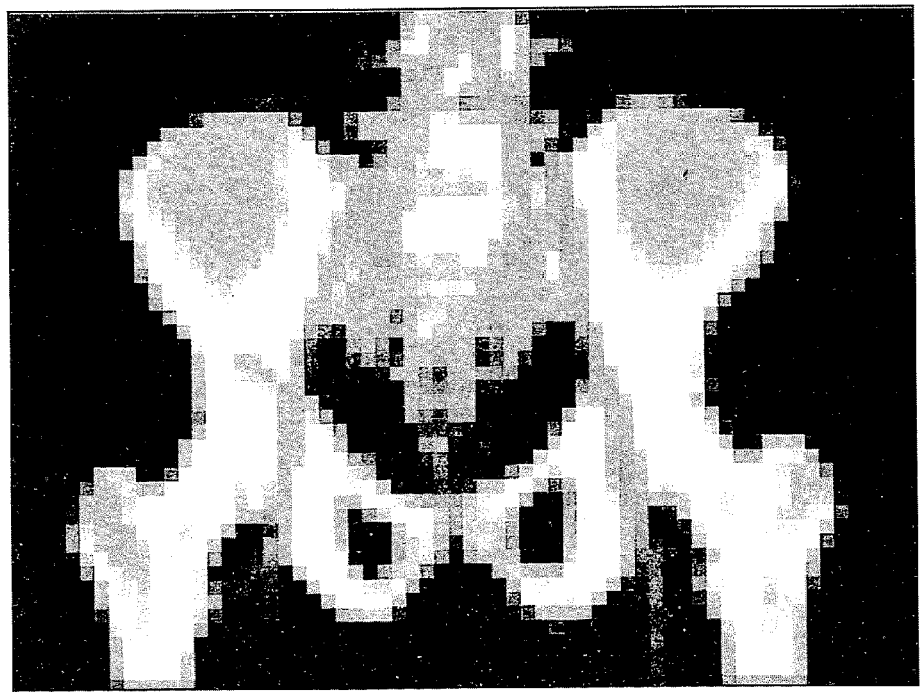
FIG. 7B is a screen shot of the pelvis shown in FIG. 7A, rendered with quality downgraded equally for all tissues due to limited system capacity.

FIGS. 7A-7D illustrate the effect of tissue prioritization using three stylistic examples. Although shown in black and white, the blood vessels have red color and are defined as a prioritized tissue. The bone is white, but is not prioritized. In FIG. 7A, the image shows the full quality rendering. FIG. 7B illustrates the image rendered with non-prioritized quality downgrade, which could appear in the case where the system capacity does not allow full quality rendering at the desired frame rate.

Figure 7C:
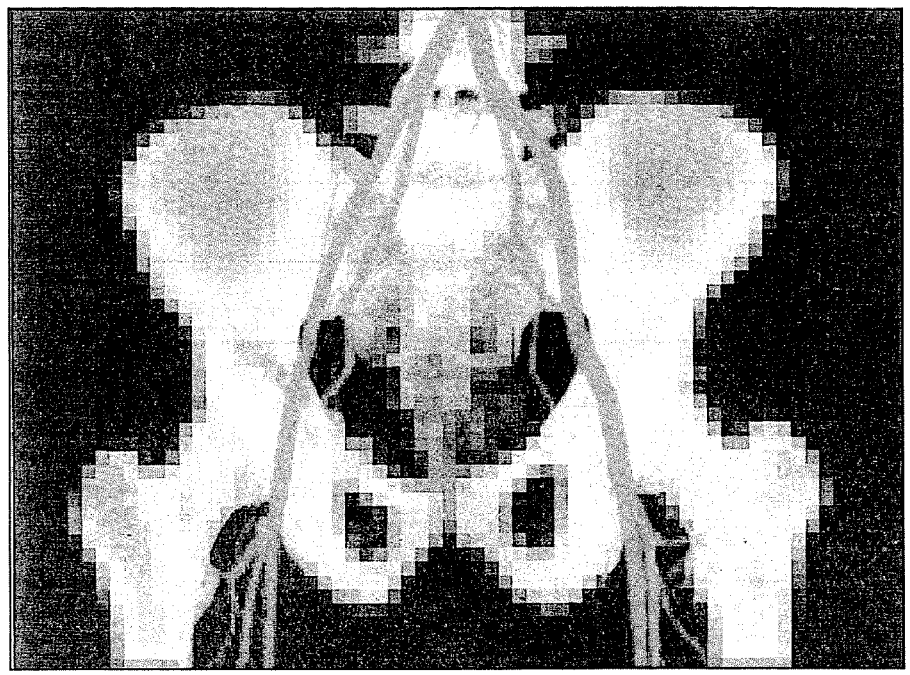
FIG. 7C is a screen shot of the image shown in FIG. 7A, rendered with prioritized tissue at full quality even with limited system capacity according to embodiments of the invention.
Figure 7D:
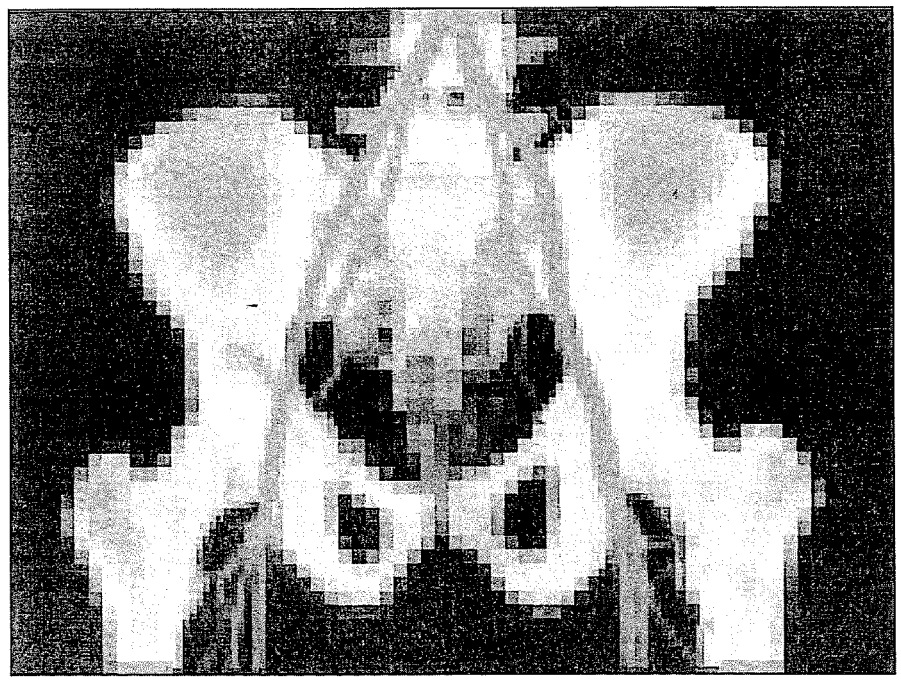
FIG. 7D is a screen shot of the image shown in FIG. 7A, rendered with a defined frame rate where the prioritized tissue is rendered at higher quality than other tissues although full quality may not be available due to limited system capacity, according to embodiments of the invention.

FIGS. 7C and 7D show different prioritization modes contemplated by embodiments of the invention. FIG. 7C shows the prioritization mode where full quality of the prioritized tissue is guaranteed. FIG. 7D shows the prioritization mode where the frame rate is guaranteed, which may prevent full quality of the prioritized tissue depending on system capacity, but where the prioritized tissue gets higher quality then the other part of the rendering.

In some embodiments, explicit tissue prioritization can have a one-to-one mapping between tissue-specific components (such as trapezoids) in the TF. This means setting a priority to each voxel of the original volumetric data set. Other voxel-based methods can be used. A different approach is to set priority to pixels in the rendered image. Similar images can be achieved through other ways of defining prioritized parts of the data set.

Figure 8:
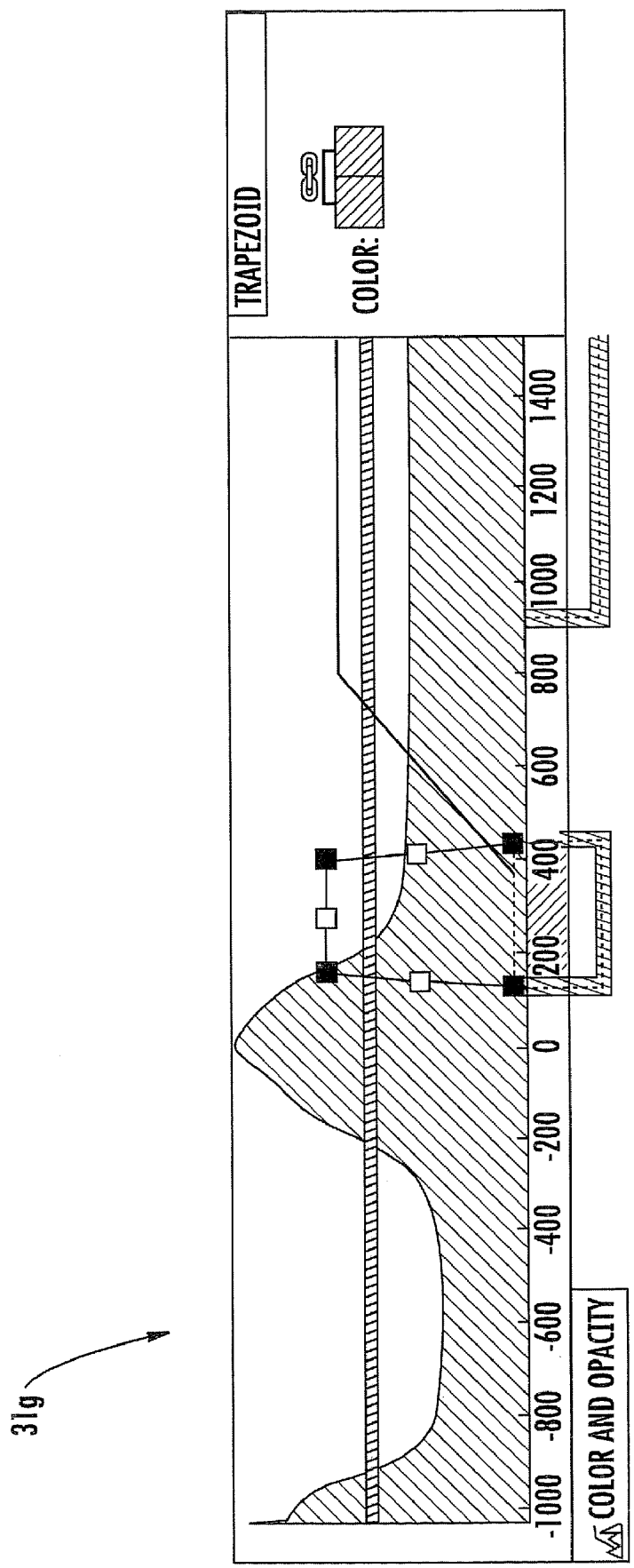
FIG. 8 is a graphic user interface for a transfer function illustrating that opacity (horizontal line) may be used to define a prioritized feature according to embodiments of the present invention.

For example, one way to define the prioritized feature is to look at properties of the original volumetric data set samples (the voxel intensities). Based on the TF, prioritized intensity ranges can be connected to, for instance, opacity level or currently changing TF ranges. FIG. 8 illustrates a GUI where a TF is shown. In this example, priority is connected to opacity level, the horizontal line drawn below the peaks in the figure. Transfer function opacities above the defined line (the given level) yield which intensity ranges (broken lines across the bottom of the graph that become the prioritized features. These values in this example correspond to values between about 200-400 and over about 950. This example does not correspond to the example images, since parts of bone tissue is also prioritized in this example.

Figure 9:
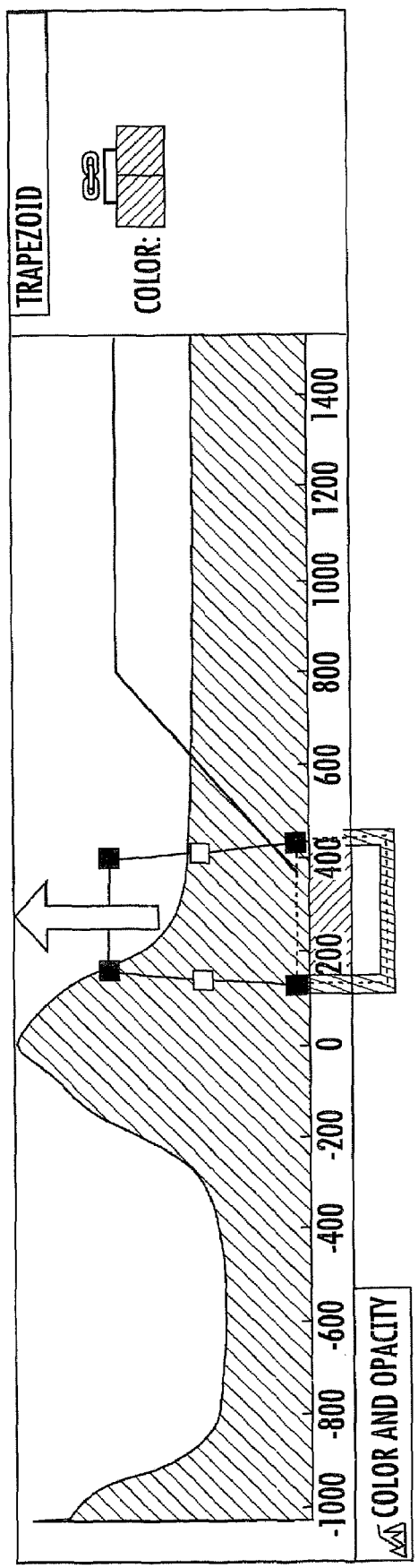
FIG. 9 is a graphic user interface for a transfer function illustrating that a prioritized feature can be associated to (user specified) changing TF ranges according to embodiments of the present invention.

Another alternative for priority definition is to look at properties of the rendered image (the pixel colors). An example would be to prioritize everything that has a color close to red in the image, this would yield a prioritization for features similar to that in FIGS. 7C and 7D above. FIG. 9 illustrates that priority can be connected to changing TF ranges. When the user interacts with the TF, for instance by changing the opacity of a trapezoid (the upward arrow) the value ranges whose mapping is changed (broken line across the bottom of the graph) is defined as prioritized. This example would roughly correspond to the prioritization in the image examples shown in FIGS. 7C and 7D.

Thus, in some embodiments, explicit tissue prioritization can have a one-to-one mapping between tissue-specific components (such as trapezoids) in the TF. This means setting a priority to each voxel of the original volumetric data set. Other voxel-based methods can be used. A different approach is to set priority to pixels in the rendered image. If pixel approaches are used, the system can be configured to predict where the prioritized image regions will end up after a rotation.

In some embodiments, in order to use this knowledge for the next frame to be rendered in a rotation sequence, the system determines where the prioritized regions of the image will appear after a rotation. To make that projection, knowledge about the depth of the data set parts shown in those image regions must be made available.

Figure 10:
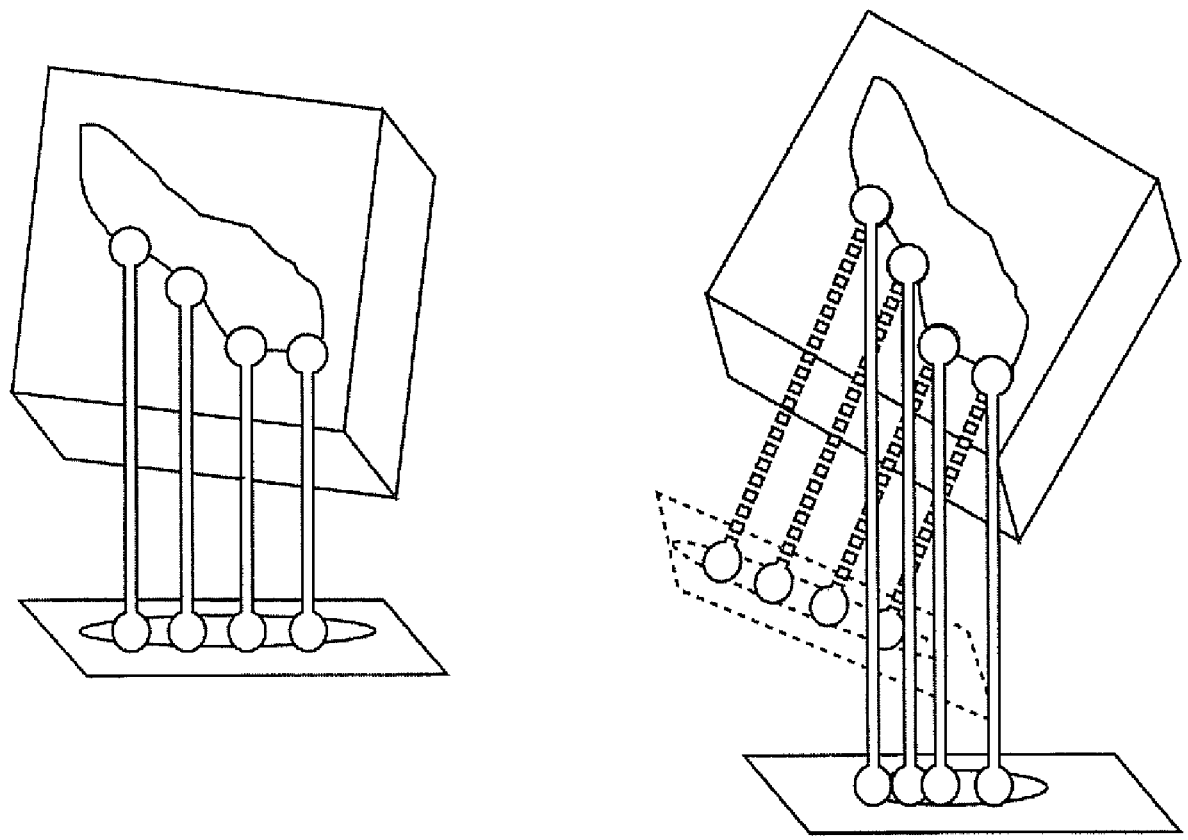
FIG. 10 is a schematic illustration of reprojecting prioritized regions in the image plane according to embodiments of the invention.

FIGS. 10A and 10B illustrate one way prioritized regions can be reprojected in the image plane. In these figures, the volume and its corresponding image is seen from above. FIG. 10A illustrates a prioritized region (white ellipse) that is defined in the image plane based on pixel properties. The rendering contributions for prioritized region come from the surface of the white object in the volume. FIG. 10B shows the view is rotated and the rendering capacity is to be focused on the prioritized region. The new position in the image plane of the prioritized region can be derived through reprojection using the volumetric position of the contributing objects.

In some embodiments using DVR, when a prioritized feature has been defined in the rendered image, the regions occupied by prioritized features will change if the region is rotated. For faster update of prioritized regions in the rendered image, the new position of these regions can be predicted by storing the depth or depth span of the corresponding volumetric samples (see Gudmundsson and Randen, *Incremental generation of projections of CT-volumes*, in Proceedings of Visualization in Biomedical Computing, 1990). The rotation in combination with the depth information can give the new position of the prioritized features in the rendered image.

As discussed above, the explicit prioritized feature is determined by a user (e.g., selected and/or controlled by a user). For example, the work flow of a direct manual definition would be in order to visualize a data set, the user first states feature definitions. Prioritized features can be defined in a number of ways as discussed herein. Typically, a feature is defined as a range in the sample domain of the data, i.e., a range of intensity values. Then the user assigns different visual appearances to the features, e.g., color and opacity values. Particularly where the system is configured to allow a user to denote color and/or opacity values, it is minimal extra work to also state whether a feature is prioritized or not.

Optionally, a user can alternatively or also explicitly select which of the defined features that are to be prioritized by setting rules. These rules can be based on several types of criteria, which also can be evaluated at different stages. In the rendering process, the data exists in three different versions, at three stages. The first is the original sample stage where the data is in its original form, e.g., a volume of intensity data. The second is the visual sample stage where the original data has been transformed to visual appearance data but still remains in the original dimensions, e.g., a volume of color/opacity data. The third version is the composited stage, the rendered image where the visual appearance data has been composited to a 2D image. If the original image is in 2D, the compositing step is not needed. Criteria for prioritized features can be applied at the two latter stages with the objective to prioritize features corresponding to perceptually important cues.

Rules for setting the prioritization attribute of features can be connected with the visual appearance of the feature (i.e., the feature's visual sample range). A typical use in some embodiments may be thresholds for opacity and/or color space regions, setting a feature as prioritized if it is visualized above the threshold in terms of its average or maximum value across its visual sample range. A perceptually adapted color space like CIEL*a*b* or CIEL*u*v* may be used. CIEL*u*v* and CIEL*a*b* are perceptually adapted color spaces, in contrast to for instance RGB. This means that a "distance", i.e., a color difference, in this space is perceived equally large everywhere. By way of example, the difference between RGB colors a=(1.0, 0, 0) and b=(0.5, 0, 0) is not perceived as equal to the difference as c=(0, 1.0, 0) and d=(0, 0.5, 0), even though the mathematical vector distance is the same: |a−b|=|c−d|. In CIELuv the color difference would be perceived as equal.

The rules may also apply to the composited stage. The prioritized features are then defined as those being part of perceptually important regions in the rendered image. Perceptual significance can be assessed from single-pixel attributes such as opacity, color luminance and/or color saturation, but also from neighborhood analysis such as boundary and structure detection measures. A typical boundary measure is the gradient magnitude. An example of a local structure measure is described in Westin et al., *Using local 3D structure for segmentation of bone from computer tomography images*, in Proceedings Computer Vision and Pattern Recognition, 1997.

The definition of prioritized features can consider situations when the full data set is not used. For example, the data set can be cropped. Moreover, in DVR, culling is typically applied to parts of the data set that do not contribute to the rendering (view-frustum culling and occlusion culling). The cropped and culled parts can automatically be set as non-prioritized features.

A summary of different prioritized feature definitions that may be used according to embodiments of the invention, include the following.

In some embodiments, the prioritized feature(s) can be defined as individual components of a Transfer Function and a 'prioritization flag' can be an additional attribute of each TF component.

In some embodiments, the explicit definition of prioritized features is performed by a user-defined rule connected to the visual appearance set for a feature. For example, one possibility is to have thresholds for parameters such as opacity, color luminance and/or color saturation, and features visualized above these thresholds can be defined as prioritized features.

The explicit definition of prioritized features can optionally be performed by a user-defined rule connected to the visual appearance of the rendered image (at the composited stage). The prioritized features can be defined as those being part of perceptually important regions in the image. Perceptual significance can be assessed from single-pixel attributes such as opacity, color luminance and/or color saturation, but also from neighborhood analysis such as boundary and structure detection measures.

In some embodiments, the system 10 can be configured to electronically store information about the position of the voxels contributing to prioritized features in the rendered image and use this information to predict the position of the prioritized features in the rendered image after a rotation has been applied.

In some embodiments, the feature definition incorporates manual cropping and automatic culling techniques such as view-frustum culling and occlusion culling such that parts of the data set that do not contribute to the rendered image are not considered part of the prioritized feature.

In some embodiments, the user can configure the prioritization such that during change of the Transfer Function, the prioritized features are automatically defined as the features significantly affected by the Transfer Function change.

The prioritization feature(s) can be stored as a template setting and can be automatically or semi-automatically be applied to subsequent visualizations of other data sets.

Figure 11:
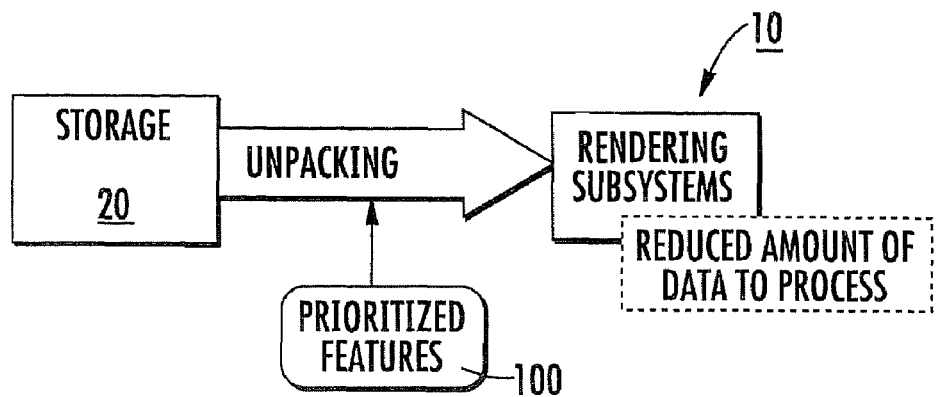
FIG. 11 is a schematic diagram of a visualization system using explicit prioritized feature(s) during unpacking to render images according to embodiments of the invention.
Figure 12:
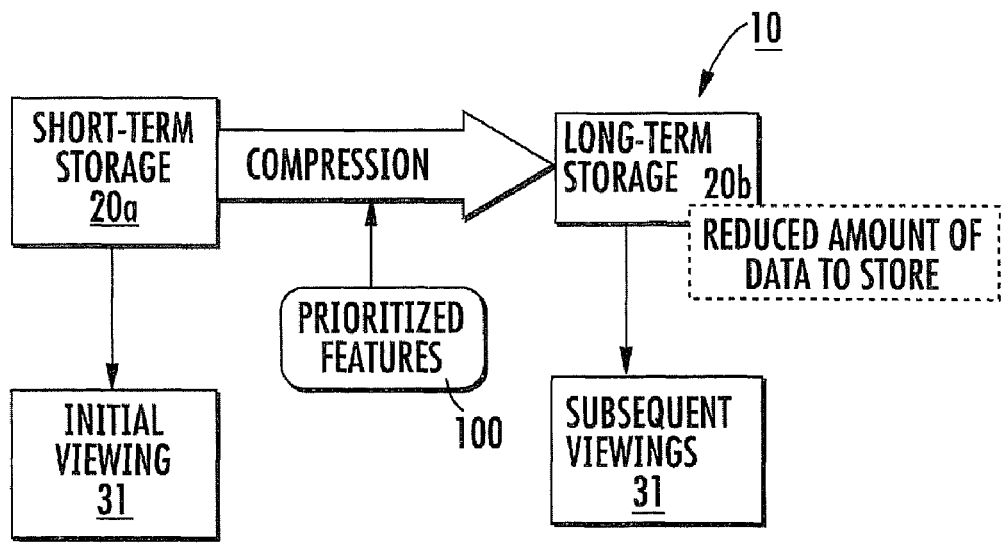
FIG. 12 is a schematic diagram of a visualization system using explicit prioritized feature(s) during compression to reduce data for long-term storage according to embodiments of the invention.

Although primarily discussed with respect to rendering, as shown in FIGS. 11 and 12, prioritized features 100 can be used by the system 10 at other data manipulation modules, subsystems or segments of the system 10. FIG. 6 illustrates that prioritized features 100 can be used during data transfer (upacking from storage) to a rendering system in a visualization pipeline. FIG. 7 illustrates that prioritized features 100 can be used to compress data from short term to long-term storage. In some embodiments, the prioritized features can be used to manipulate data for all of these aspects.

In some embodiments, the prioritization can be facilitated by use of appropriate rendering algorithms. An important way of doing this is multiresolution schemes where level-of-detail (LOD) selections are made for small regions of the data set or the rendered image. The rendering algorithm and data management scheme adapt to the LOD selections in order to accelerate the processing. For an example of a multiresolution scheme for DVR based on LOD selections in the data set, see Ljung et al., *Transfer Function Based Adaptive Decompression for Volume Rendering of Large Medical Data Sets*, in Proceedings IEEE Symposium on Volume Visualization, 2004 and PCT/EP2004/011290. Thus, the rendering can be configured so that the prioritization is employed in a level-of-detail selection scheme for the data set such as the block-based scheme by Ljung et al. See, *Adaptive Sampling in Single Pass, GPU-based Raycasting of Multiresolution Volumes*, in Proceedings Eurographics/IEEE International Workshop on Volume Graphics, 2006 (describing object space sampling) as will be discussed further below with respect to some aspects of the invention.

In some embodiments of the invention, the prioritized feature rendering can use methods that that exploit LOD selections in the rendered image. The LOD selection can be derived based on the prioritized features. The techniques can employ a method to accelerate DVR through dividing the screen space (the image to render) into tiles and render less important tiles at low resolution: Ljung, *Adaptive Sampling in*

*Single Pass, GPU-based Raycasting of Multiresolution Volumes,* in Proceedings Eurographics/IEEE International Workshop on Volume Graphics, 2006. Different tiles of the screen are rendered at different resolution, a low-priority tile of 16×16 pixels may be rendered as 4×4 pixels and the expanded to 16×16, which increases performance.

Thus, prioritization can be employed in a level-of-detail assignment scheme for regions of the image to be rendered and optionally the level-of-detail assignment can be electronically collected for tiles and used to set a resolution level for each tile, corresponding to the number of pixel samples to be calculated for the tile. Further discussion of the tile rendering methodology will be provided below.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic or other electronic storage devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

Certain of the program code may execute entirely on one or more of the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). In some embodiments, some program code may execute on local computers and some program code may execute on one or more local and/or remote server. The communication can be done in real time or near real time or off-line using a volume data set provided from the imaging modality.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 13:
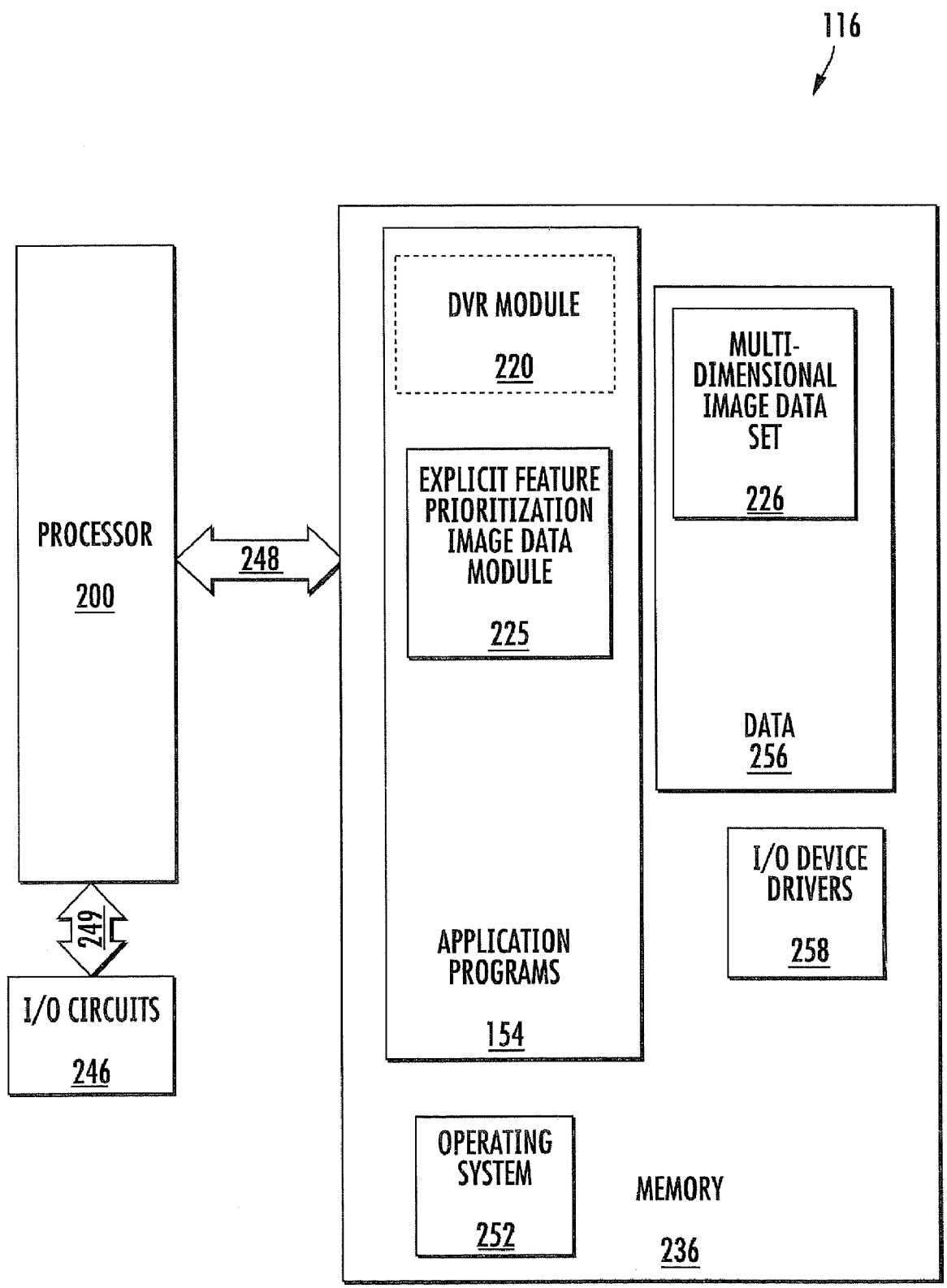
FIG. 13 is a block diagram of a data processing system according to embodiments of the present invention.

As illustrated in FIG. 13, embodiments of the invention may be configured as a data processing system 216, which can be used to carry out or direct operations of the rendering, and can include a processor circuit 200, a memory 236 and input/output circuits 246. The data processing system may be incorporated in, for example, one or more of a personal computer, workstation 116, server, router or the like. The system 116 can reside on one machine or between a plurality of machines. The processor 200 communicates with the memory 236 via an address/data bus 248 and communicates with the input/output circuits 246 via an address/data bus 249. The input/output circuits 246 can be used to transfer information between the memory (memory and/or storage media) 236 and another computer system or a network using, for example, an Internet protocol (IP) connection. These components may be conventional components such as those used in many conventional data processing systems, which may be configured to operate as described herein.

In particular, the processor 200 can be commercially available or custom microprocessor, microcontroller, digital signal processor or the like. The memory 236 may include any memory devices and/or storage media containing the software and data used to implement the functionality circuits or modules used in accordance with embodiments of the present invention. The memory 236 can include, but is not limited to, the following types of devices: ROM, PROM, EPROM, EEPROM, flash memory, SRAM, DRAM and magnetic disk. In some embodiments of the present invention, the memory 236 may be a content addressable memory (CAM).

As further illustrated in FIG. 13, the memory (and/or storage media) 236 may include several categories of software and data used in the data processing system: an operating system 252; application programs 154; input/output device drivers 258; and data 256. As will be appreciated by those of skill in the art, the operating system 252 may be any operating system suitable for use with a data processing system, such as IBM®, OS/2®, AIX® or zOS® operating systems or Microsoft® Windows®95, Windows98, Windows2000® or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 258 typically include software routines accessed through the operating system 252 by the application programs 154 to communicate with devices such as the input/output circuits 146 and certain memory 136 components. The application programs 154 are illustrative of the programs that implement the various features of the circuits and modules according to some embodiments of the present invention. Finally, the data 256 represents the static and dynamic data used by the application programs 154 the operating system 252 the input/output device drivers 258 and other software programs that may reside in the memory 236.

The data 256 may include (archived or stored) multi-dimensional patient digital image data sets 226 that provides stacks of image data correlated to respective patients. As further illustrated in FIG. 13, according to some embodiments of the present invention application programs 154 include an Explicit Feature Prioritization Image Data Module 225. The application programs may also optionally include a DVR Module (220) and a data interface module can be decoupled or isolated from the DVR module. The application program 154 may be located in a local server (or processor) and/or database or a remote server (or processor) and/or database, or combinations of local and remote databases and/or servers.

While the present invention is illustrated with reference to the application programs 154 in FIG. 13, as will be appreciated by those of skill in the art, other configurations fall within the scope of the present invention. For example, rather than being application programs 154 these circuits and modules may also be incorporated into the operating system 252 or other such logical division of the data processing system. Furthermore, while the application program 154 is illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 13 but may be provided by other arrangements and/or divisions of functions between data processing systems. For example, although FIG. 13 is illustrated as having various circuits and modules, one or more of these circuits or modules may be combined or separated without departing from the scope of the present invention.

As noted above, some embodiments of the invention are directed to novel direct volume rendering techniques for adaptive image-space sampling density of multiresolution volumes.

A goal of image-space adaptive sampling is to reduce the number of evaluated rays in the rendering while maintaining image quality such that the rendering time can be reduced in a controllable way, thus providing better interactivity. In addition, it should be suitable for implementation using graphics hardware and support efficient reconstruction of a final image. A tile-based approach can adapt the resolution of each tile can be adapted, in a single rendering pass or over time.

Figure 15:
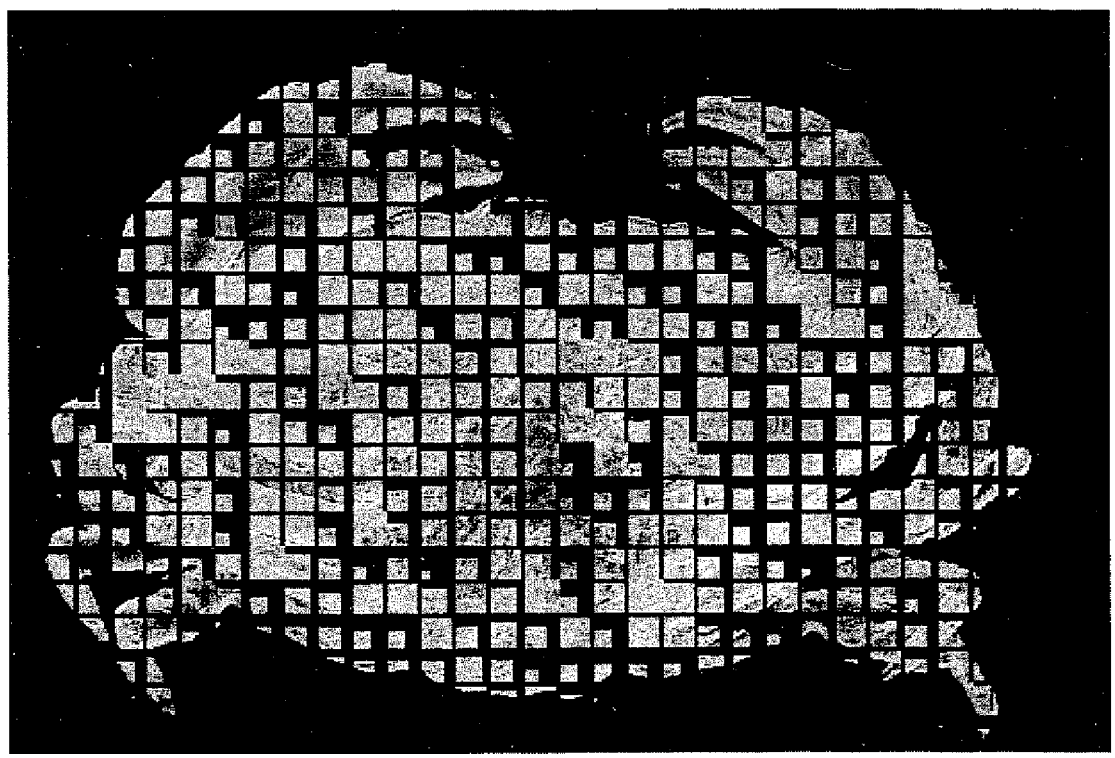
FIG. 15 is a graphic illustration of a crab dataset rendered using random screen space sampling. The top image shows the original framebuffer with the rendered tiles. The bottom shows the reconstructed image using intertile interpolation.
Figure 15:
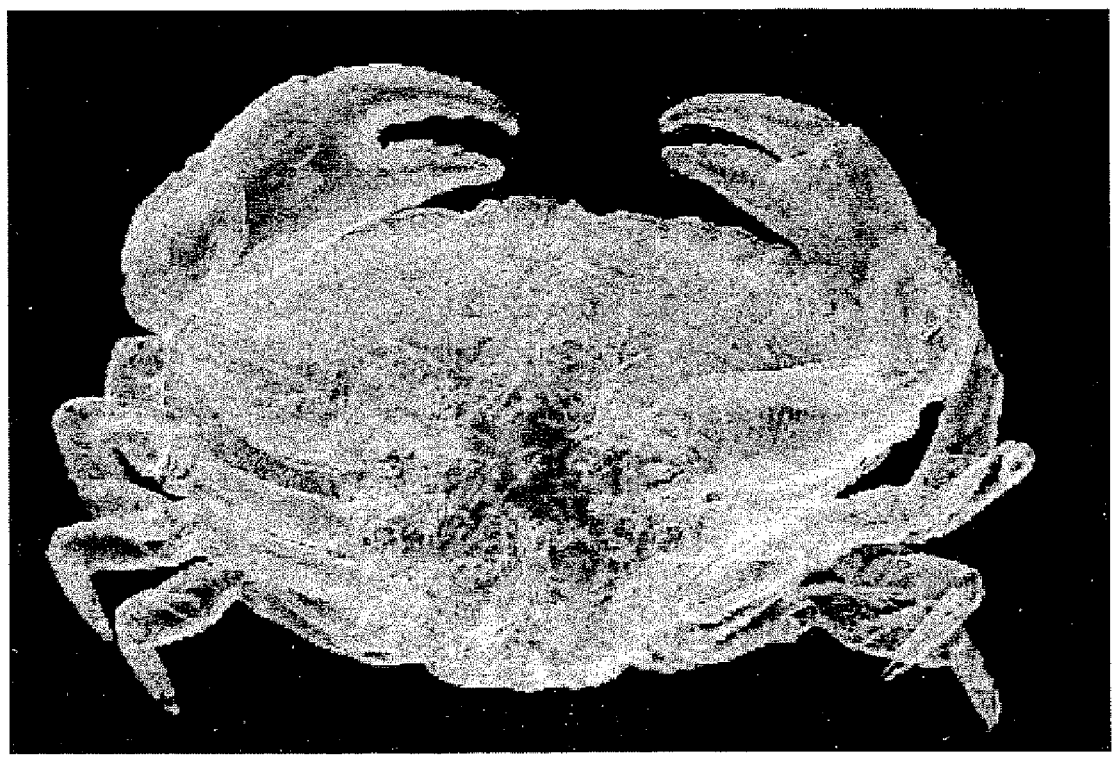

The framebuffer is divided into a number of equally large tiles, denoted with the tilesize $\tau_{max}$. Each tile is given a specific LOD, $\tau$, and rendered at that resolution level. Resolutions are not restricted to be in powers of two. The LOD selection is, in the context of embodiments of the invention, derived from the definition of prioritized features, where high or full quality corresponds to high or full resolution/LOD, respectively. Given the LOD selection, the tiles can be rendered according to their assigned size. This can be achieved by changing the viewport and projection matrix in OpenGL and then rendering the volume bounding box. This procedure is repeated for all tiles. The framebuffer now contains an image which looks like a mosaic, see top image in FIG. 15. Since the tiles in the framebuffer are not tightly packed, it is also possible to update individual tiles and reconstruct incrementally improved images without having to re-render the entire scene.

Changing the viewport and projection matrix per tile may be undesirable. Hence, a second tile rendering technique can be used. This method begins with rendering the volume bounding box and uses a framebuffer object to store texture entry points, $x_0$, and view direction for each pixel, similar to the method in KRÜGER J., ET AL., *Acceleration techniques for gpu-based volume rendering*, in Proceedings IEEE Visualization 2003 (2003), pp. 287-292. In a second, pass polygons of size $E_t$ are rendered for each tile t, mapping the full tile size, $\tau_{max}$, in the previously rendered framebuffer object.

Figure 14:
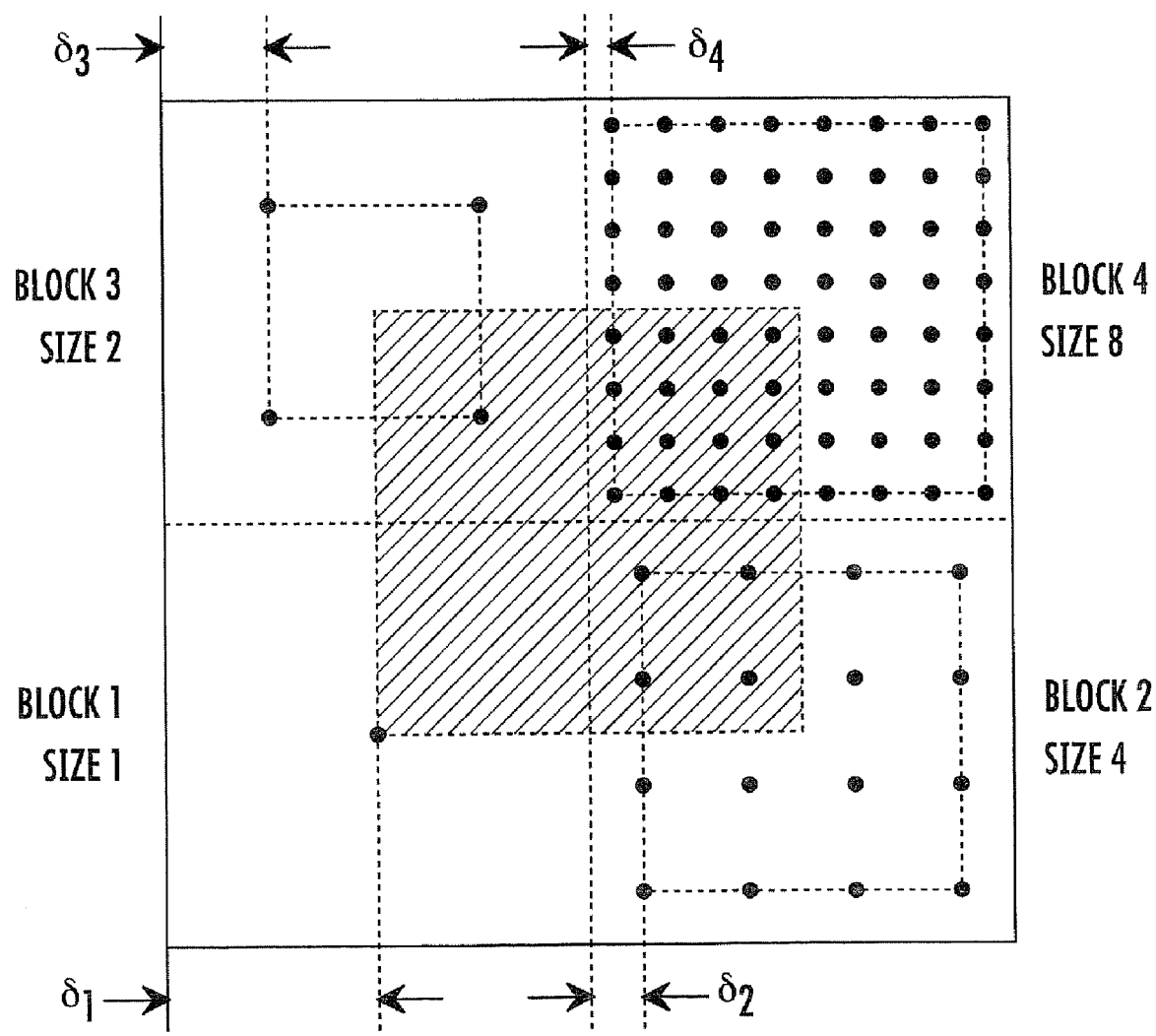
FIG. 14 is a graphic illustration of four blocks in a neighborhood. Sample values within each tile are indicated by small points. A sample boundary is shown by dashed lines within each block and mark the domain for texture coordinate for each block. The distances from the sample boundary to the block borders are indicated with $\delta t$ for each block t. The center grey area between block centers indicates the domain for interblock interpolation.

As the last step of this adaptive image-space sampling technique the final image is reconstructed from the mosaic image. To this end, the 3D interblock interpolation described in LJUNG P., ET AL., *Multiresolution interblock interpolation in direct volume rendering*, in Proceedings Eurographics/IEEE Symposium on Visualization 2006 (2006), pp. 259-266, can be adapted to 2D and renamed intertile interpolation, as briefly summarized here. FIG. 14 illustrates a neighborhood of four tiles and a sample, $\phi$, lying somewhere (in the grey area) between the tile centers to be computed. A sample, $\phi_t$, from each tile, t, is taken using texture coordinate clamping (EQN). A local intertile coordinate, $x^*=\text{frac}(x+0.5)-0.5$, is then used to compute edge weights, $e_{i,j}$, between tiles, i and j, sharing sides.

$$e_{i,j}(\rho)=C_0^{-1}((\rho+\delta_i)/(\delta_i+\delta_j)), \tag{1}$$

where $\rho$ denotes either $x^*_x$ or $x^*_y$ and $\delta_t=\frac{1}{2}\tau_t$. The sample, $\phi$, is then computed as the normalized sum $$\varphi = \frac{\sum_{t=1}^{4}\omega_t\varphi_t}{\sum_{t=1}^{4}\omega_t}, \tag{2}$$

with the tile weights, $\omega_t$, defined as $\omega 1=(1-e_{1,2})\cdot(1-e_{1,3})$, $\omega 2=e_{1,2}\cdot(1-e_{2,4})$, $\omega 3=(1-e_{3,4})\cdot e_{1,3}$, $\omega 4=e_{3,4}\cdot e_{2,4}$.

The following summarizes the results and analysis of the above. All tests were performed on an AMD AthlonX2 64 using an ATI X1800XT GPU (ATI) with 512 MB of memory and a Pentium 4 using an NVidia GeForce 7800GTX GPU (NV) with 256 MB of memory.

Figure 16:
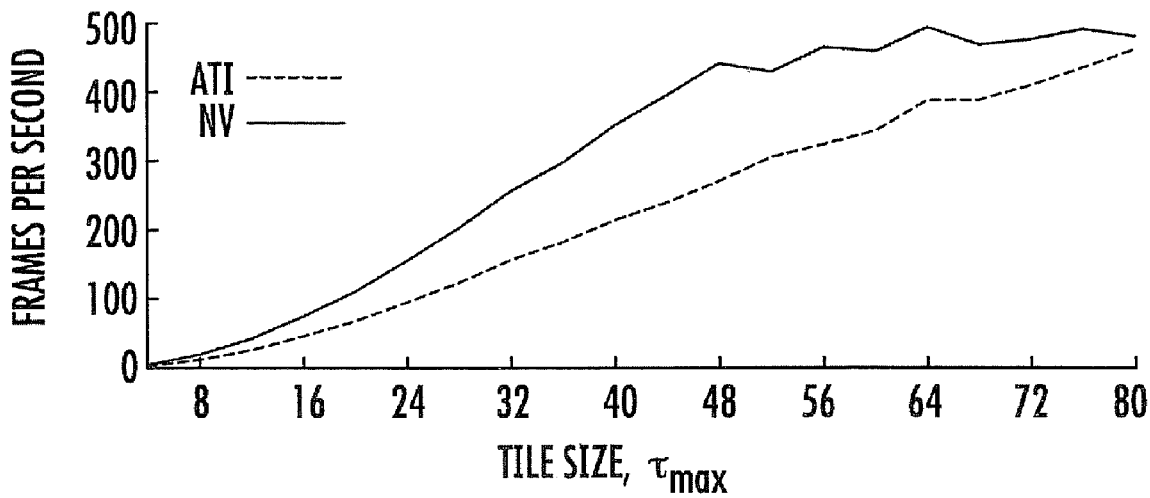
FIG. 16 is a graph of frames per second versus tile size.
Figure 17:
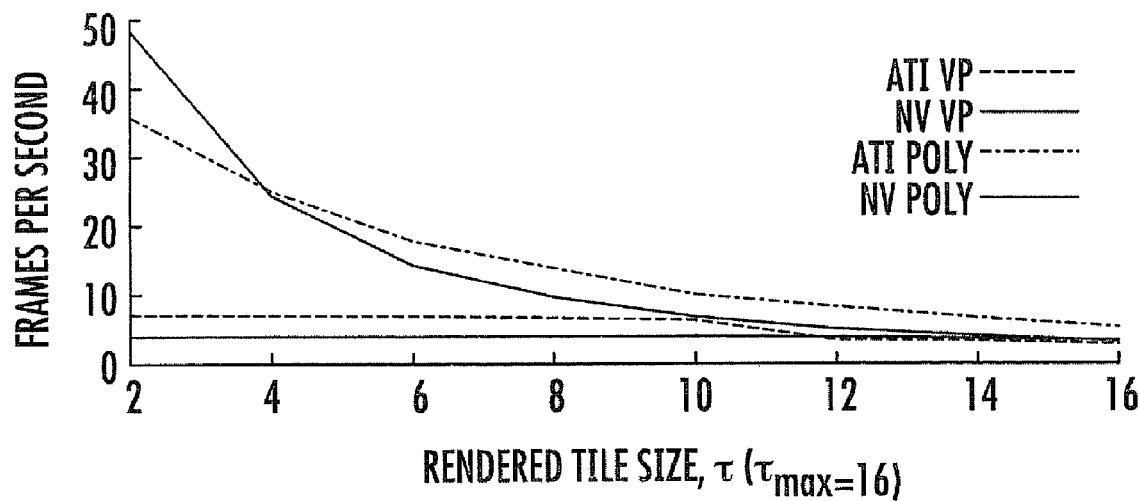
FIG. 17 is a graph of frames per second versus rendered tile size. The graph illustrates the performance of uniformly reducing the rendered tile size, $\tau$, using a constant tilting of $\tau$ max=16 in a 1024×1024 viewport. VP refers to the viewport method and Poly refers to the polygon method. The viewport method has significant scaling issues (the lower two lines in the graph).

Volume rendering is clearly output-sensitive and typically scales linearly with the number of pixels being processed. The goal of the tile-based rendering is to reduce the overall processing requirement by rendering tiles at varying resolutions. For an ideal situation the performance gain should scale with the reduction of the number of pixels. The initial concern is therefore the overhead cost of the imposed tilerendering approach. A simple surface shader was first used to measure performance versus tile size ($\tau_{max}$) and reducing rendered tile size ($\tau$), having $\tau_{max}$ constant. The results are shown in FIGS. 16 and 17. FIG. 16 clearly shows that decreased tile size decreases the frame rate and the overhead of the viewport method is thus not suitable for small tiles, preventing fine-grained LOD adaption. Polygon based tile rendering for the simple surface shader is constantly high for tile sizes over 12 pixels, about 800 FPS for NVidia and 160 FPS for ATI. The lower frame rate on ATI is related to the use of the FBO. The polygon approach shows a significant speed-up when reducing the tile size, $\tau$, holding the maximum tile size constant, as can be seen in FIG. 17. The performance is, however, not scaling linearly with the number of rendered pixels as intended.

The image-space adaptive LOD rendering presents significant potential speed-up. The number of rendered pixels can be significantly reduced while maintaining high quality renderings.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A visualization system for rendering images from a multi-dimensional data set, comprising:
 a display with a user input in communication with an interactive visualization system, the user input including a direct electronic priority control input that allows a user to affirmatively designate at least one explicit prioritized feature in an image rendered from a multi-dimensional image data set and, in response, the interactive visualization system electronically assigns a viewing parameter priority for subsequent visualization for the affirmatively designated at least one explicit prioritized feature, wherein the at least one prioritized feature is automatically electronically rendered with high or full quality in different interactively requested rendered images of the image data while other non-prioritized features are rendered at lower quality.

2. A system according to claim 1, wherein the user input is configured to allow a user to define a color for at least one feature in the rendered image and to designate whether that feature with the defined color is the at least one prioritized feature.

3. A system according to claim 1, wherein the multi-dimensional data set is a medical image data set.

4. A system according to claim 3, wherein the at least one prioritized feature is tissue or other anatomically or physiologically relevant feature.

5. A system according to claim 1, wherein the multi-dimensional data set is a volumetric or time varying volumetric data set, and wherein the visualization system is configured to visualize with Direct Volume Rendering.

6. A system according to claim 1, wherein the system comprises a rendering circuit in communication with the user input, and wherein the user input is configured to allow a user to select whether the at least one prioritized feature is: (a) to be rendered at high or full quality with a potential delay in frame rate; or (b) to be rendered at an acceptable frame rate with a potential degradation in quality but at a quality that is greater than non-prioritized features in the rendered images whereby the non-prioritized feature quality is dependent on system resources.

7. A system according to claim 1, wherein the system is configured to interactively display Direct Volume Renderings of different views of a region of a body of a patient based on the image data set in response to a user's interactive commands to tilt, zoom, rotate, crop or otherwise manipulate the rendered images, with the different views automatically rendering the at least one prioritized feature with high or full resolution while automatically rendering the non-prioritized features at low resolution to thereby allocate system storage and/or rendering resources to the prioritized feature.

8. A system according to claim 1, wherein the prioritized feature is an individual component of a Transfer Function (TF), where a prioritized flag is an attribute of a TF component.

9. A system according to claim 1, wherein the explicit prioritized feature is defined based on a user-defined rule connected to a visual appearance of a feature.

10. A system according to claim 9, wherein a feature visualized with at least one of opacity, color luminance and color saturation above a threshold value is defined as the prioritized feature.

11. A system according to claim 1, wherein the explicit prioritized feature is defined based on a user-defined rule connected to a perceptually significant visual appearance of a region in the rendered image at a composited stage.

12. A system according to claim 11, wherein the perceptual significance is based on single-pixel attributes including opacity, color luminance and/or color saturation.

13. A system according to claim 11, wherein the perceptual significance is based on neighborhood analysis of boundary and structure.

14. A system according to claim 1, further comprising a circuit configured to electronically store data regarding position of voxels contributing to the at least one prioritized feature in the rendered image, then electronically project the position of the prioritized feature in the rendered image after a rotation has been applied.

15. A system according to claim 1, wherein the system is configured so that parts of the data set that have been culled or cropped are automatically excluded from being part of the at least one explicit prioritized feature.

16. A system according to claim 1, wherein the at least one prioritized feature is stored as an electronically selectable template setting that can be applied to subsequent visualizations of other data sets of similar regions of a body or similar examination types.

17. A system according to claim 1, wherein the system is configured so that the at least one prioritized feature is visualized with high or full quality relative to non-prioritized features during user interaction with the visualization including at least one of rotation of a volume and Transfer Function change in Direct Volume Rendering while maintaining a high frame rate of at least about 10 frames per second thereby providing the at least one prioritized feature in high or full quality in the rendered images to the user in substantially real time.

18. A system according to claim 1, wherein the system comprises a visualization pipeline with a server and at least one client, and wherein the system is configured to reduce bandwidth to 10% or less of the original data for data transfer in the visualization pipeline between the server to a client or from an electronic storage disk to a display associated with the client.

19. A system according to claim 1, wherein the system comprises a user input that allows a user to affirmatively command the data set to be stored with the explicitly defined prioritized feature for subsequent high visualization quality and use of the stored data.

20. A system according to claim 1, wherein the system is configured so that the explicit prioritized feature is rendered using a level-of-detail selection method for the data set.

21. A system according to claim 1, wherein the system is configured so that the explicit prioritized feature is rendered using a level-of-detail assignment for regions of the image.

22. A system according to claim 21, wherein the level-of-detail is collected for tiles and used to set a resolution level for each tile, the resolution corresponding to a number of pixel samples calculated for a respective tile.

23. A system according to claim 1, wherein the user input is configured to allow a user to: (a) define features; (b) denote color and/or opacity values for the defined features; and (c) affirmatively designate whether a defined feature has the explicit prioritization.

24. A system according to claim 1, wherein the user input is a graphic user interface that provides the priority control input and is configured to allow a user to apply an electronic priority label to affirmatively designate the explicit prioritized feature.

25. A method of rendering high or full quality features in a visualization system having limited system capacity, comprising:
    accepting user input to directly define at least one explicit prioritized feature of interest in a rendered image via an electronic prioritization control button, icon or pull-down menu;
    in response to the user input, electronically assigning a viewing parameter priority for subsequent visualization for the defined at least one explicit prioritized feature; and
    interactively rendering and displaying a series of medical images using the at least one explicit prioritized feature, wherein the at least one prioritized feature is automatically electronically rendered with high or full quality in different interactively requested rendered images of the image data while other non-prioritized features are rendered at lower quality.

26. A method according to claim 25, further comprising:
    allowing a user to designate whether the system is to render the images with the at least one prioritized feature at an acceptable frame rate with a potential degradation from full quality or whether the system is allowed to operate at a slower frame rate to command that the prioritized feature to be rendered at full quality.

27. A signal processor circuit comprising a rendering module for rendering images from respective patient multidimensional imaging data sets obtained from different imaging modalities, wherein the circuit is configured to communicate with a graphical user interface having an electronic explicit priority selection control input associated with a client workstation to accept user input to directly define at least one explicit prioritized feature in an image rendered from a multi-dimensional image data set, wherein the at least one prioritized feature is automatically electronically rendered with high or full quality in different interactively requested rendered images of the image data while non-prioritized features are rendered at lower quality.

28. A circuit according to claim 27, wherein the user input is configured to allow a user to: (a) define features; (b) denote color and/or opacity values for the defined features; and (c) directly define whether a defined feature has explicit prioritization.

29. A circuit according to claim 27, wherein the electronic explicit priority selection control input is configured to allow a user to apply an electronic priority label to directly define the explicit prioritized feature.

30. A computer program product for providing physician interactive access to patient medical volume data for rendering diagnostic medical images, the computer program product comprising:
    a computer readable non-transitory storage medium having computer readable program code embodied in the medium, the computer-readable program code comprising:
    computer readable program code configured to accept user input to directly define at least one explicit prioritized feature in an image rendered from a multi-dimensional image data set using an electronic priority label input; and
    computer readable program code configured to electronically assign a viewing parameter priority for subsequent visualization for the defined at least one explicit prioritized feature, wherein the at least one prioritized feature is automatically electronically rendered with high or full quality in different interactively requested rendered images of the image data while other non-prioritized features are rendered at lower quality.

* * * * *

UNITED STATES PATENT AND TRADEMARK OFFICE
CERTIFICATE OF CORRECTION

| | | |
|---|---|---|
| PATENT NO. | : 7,830,381 B2 | Page 1 of 1 |
| APPLICATION NO. | : 11/614387 | |
| DATED | : November 9, 2010 | |
| INVENTOR(S) | : Lundström et al. | |

It is certified that error appears in the above-identified patent and that said Letters Patent is hereby corrected as shown below:

In the Specification;

Column 18, Line 14: Please correct "ϕ" to read -- φ --

Line 15: Please correct "ϕ$_t$" to read -- φ$_t$ --
Line 22: Please correct " sample, ϕ" to read -- sample, φ --

Signed and Sealed this
Third Day of May, 2011

David J. Kappos
*Director of the United States Patent and Trademark Office*